United States Patent
Park et al.

(10) Patent No.: US 11,062,683 B2
(45) Date of Patent: **\*Jul. 13, 2021**

(54) DIGITAL SIGNAGE AND OPERATING METHOD THEREOF

(71) Applicant: LG ELECTRONICS INC., Seoul (KR)

(72) Inventors: Chala Park, Seoul (KR); Youngran Kim, Seoul (KR); Jaesun Yun, Seoul (KR); Seunghun Lee, Seoul (KR); Soungjoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/614,021

(22) PCT Filed: Dec. 7, 2017

(86) PCT No.: PCT/KR2017/014308
§ 371 (c)(1),
(2) Date: Nov. 15, 2019

(87) PCT Pub. No.: WO2018/225914
PCT Pub. Date: Dec. 13, 2018

(65) Prior Publication Data
US 2020/0090628 A1 Mar. 19, 2020

(30) Foreign Application Priority Data

Jun. 8, 2017 (KR) .................. 10-2017-0071854

(51) Int. Cl.
*G09G 3/20* (2006.01)
*G09G 5/38* (2006.01)
(Continued)

(52) U.S. Cl.
CPC .......... *G09G 5/38* (2013.01); *G06Q 30/0261* (2013.01); *G06Q 30/0277* (2013.01);
(Continued)

(58) Field of Classification Search
CPC ........... G09G 3/20; G09G 5/00; G09G 5/005; G09G 5/14; G09G 5/38; G09G 2310/04;
(Continued)

(56) References Cited

U.S. PATENT DOCUMENTS 8,144,218 B2  3/2012  Wen
9,253,429 B2  2/2016  Kikkawa
(Continued)

FOREIGN PATENT DOCUMENTS

CN  1848911 A  10/2006
CN  1904998 A  1/2007
(Continued)

*Primary Examiner* — Joe H Cheng
(74) *Attorney, Agent, or Firm* — Birch, Stewart, Kolasch & Birch, LLP

(57) ABSTRACT

A digital signage including a display panel configured to display content; a controller configured to: display first content in a first area of the display panel, obtain display panel control data for preventing an afterimage, based on received afterimage-related data, and move the display panel a predetermined amount and display the first content in a second area of the display panel based on the display panel control data.

20 Claims, 23 Drawing Sheets

(51) Int. Cl.
  *G06Q 30/02* (2012.01)
  *G09F 9/30* (2006.01)
  *G09G 5/00* (2006.01)
(52) U.S. Cl.
  CPC ............. *G09F 9/301* (2013.01); *G09G 5/005* (2013.01); *G09G 2310/04* (2013.01); *G09G 2320/0257* (2013.01); *G09G 2320/041* (2013.01); *G09G 2320/0693* (2013.01); *G09G 2320/103* (2013.01); *G09G 2340/16* (2013.01); *G09G 2354/00* (2013.01); *G09G 2380/02* (2013.01); *G09G 2380/06* (2013.01)
(58) Field of Classification Search
  CPC ... G09G 2320/0233; G09G 2320/0257; G09G 2320/041; G09G 2320/0693; G09G 2320/103; G09G 2340/16; G09G 2354/00; G09F 9/301
  See application file for complete search history.

(56) References Cited

U.S. PATENT DOCUMENTS

| | | | |
|---|---|---|---|
| 2003/0076332 A1 | 4/2003 | Choi | |
| 2003/0210285 A1* | 11/2003 | Numano | G06F 3/0481 715/856 |
| 2005/0204313 A1 | 9/2005 | Enoki et al. | |
| 2009/0198823 A1 | 8/2009 | Bannister et al. | |
| 2011/0292081 A1* | 12/2011 | Matsunobu | G06F 3/1423 345/655 |
| 2012/0154427 A1* | 6/2012 | Sugiyama | G09G 3/36 345/593 |
| 2013/0182001 A1* | 7/2013 | Hwang | G06Q 30/02 345/581 |
| 2015/0070340 A1* | 3/2015 | Trachtenberg | H04N 21/4122 345/211 |
| 2015/0091948 A1 | 4/2015 | Kwa | |
| 2016/0042682 A1* | 2/2016 | Lim | H04N 5/63 345/212 |
| 2016/0117962 A1* | 4/2016 | Jung | H04N 21/4223 345/156 |
| 2016/0189336 A1 | 6/2016 | Lee et al. | |
| 2016/0203754 A1 | 7/2016 | Lee et al. | |
| 2016/0307545 A1 | 10/2016 | Lee et al. | |
| 2017/0004753 A1 | 1/2017 | Kim et al. | |
| 2017/0038928 A1 | 2/2017 | Park et al. | |
| 2018/0198979 A1* | 7/2018 | Katsumata | H04N 5/225 |
| 2018/0232120 A1* | 8/2018 | Son | G06F 3/04883 |
| 2018/0374452 A1 | 12/2018 | Choi et al. | |

FOREIGN PATENT DOCUMENTS

| | | |
|---|---|---|
| CN | 102804756 A | 11/2012 |
| CN | 102903346 A | 1/2013 |
| CN | 105741768 A | 7/2016 |
| CN | 105930119 A | 9/2016 |
| CN | 106023887 A | 10/2016 |
| CN | 106297705 A | 1/2017 |
| CN | 106328057 A | 1/2017 |
| FR | 2 929 742 A1 | 10/2009 |
| JP | 2007-304318 A | 11/2007 |
| KR | 10-2007-0025292 A | 3/2007 |
| KR | 10-2010-0058757 A | 6/2010 |
| KR | 10-2016-0019341 A | 2/2016 |
| KR | 10-2017-0020998 A | 2/2017 |
| KR | 10-2017-0058223 A | 5/2017 |
| KR | 10-2019-0021051 A | 3/2019 |
| WO | WO 2008/056566 A1 | 5/2008 |
| WO | WO 2017/030244 A1 | 2/2017 |
| WO | WO 2017/086689 A1 | 5/2017 |

* cited by examiner

[Fig. 1]
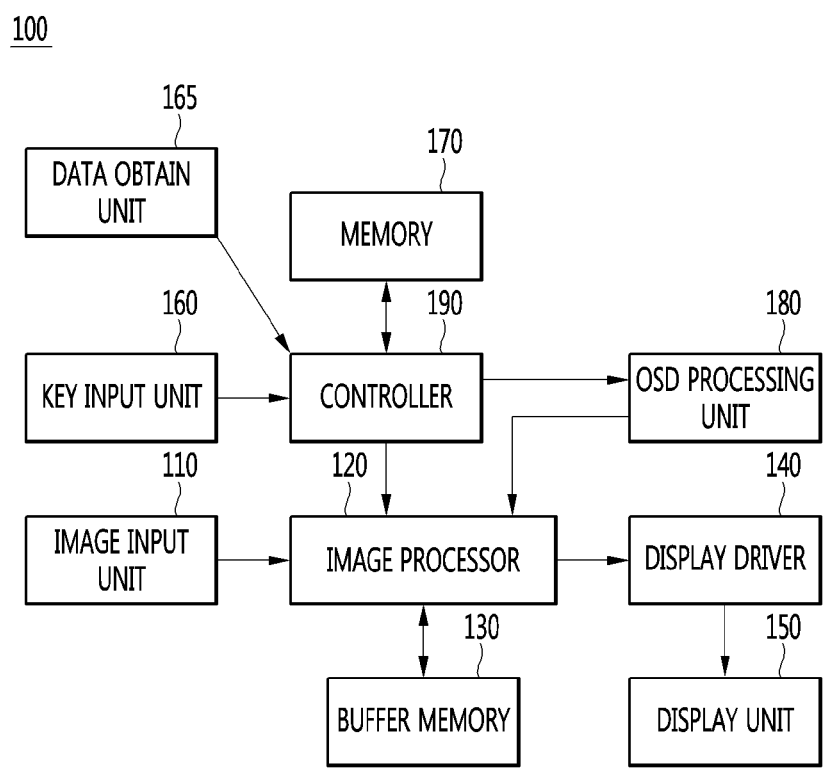

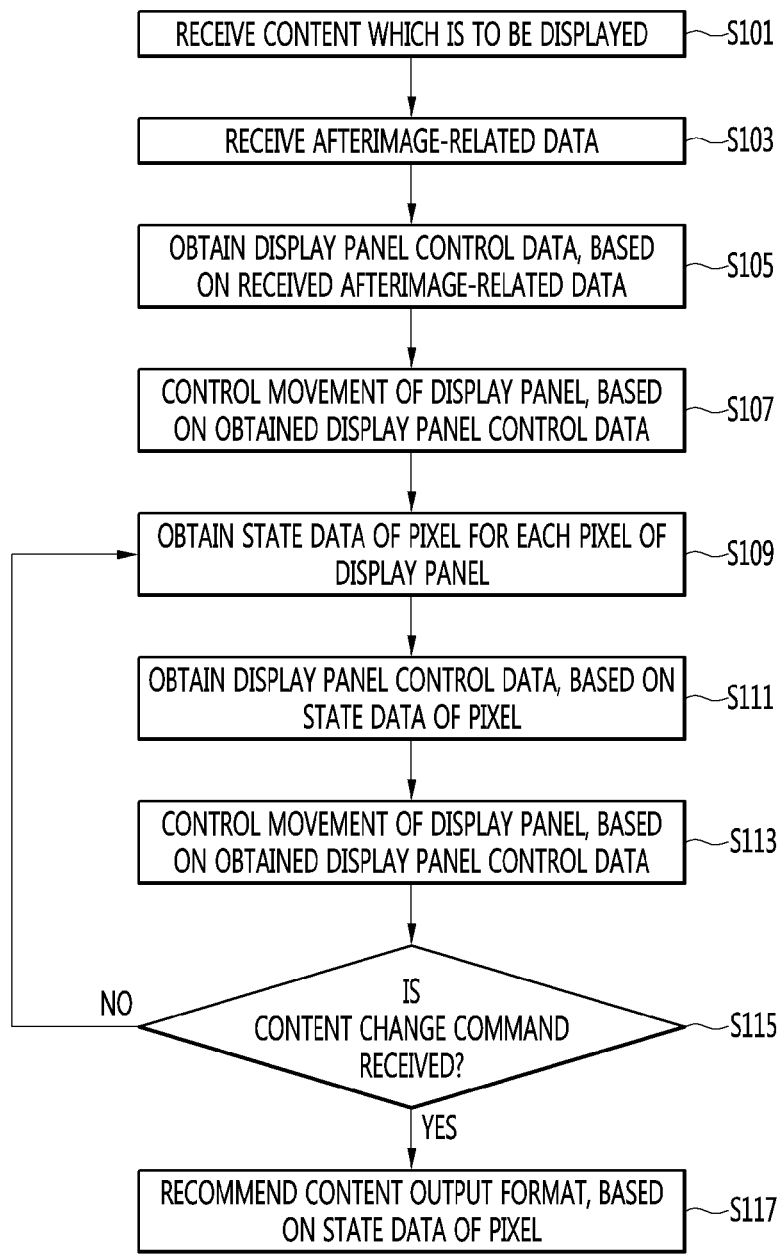

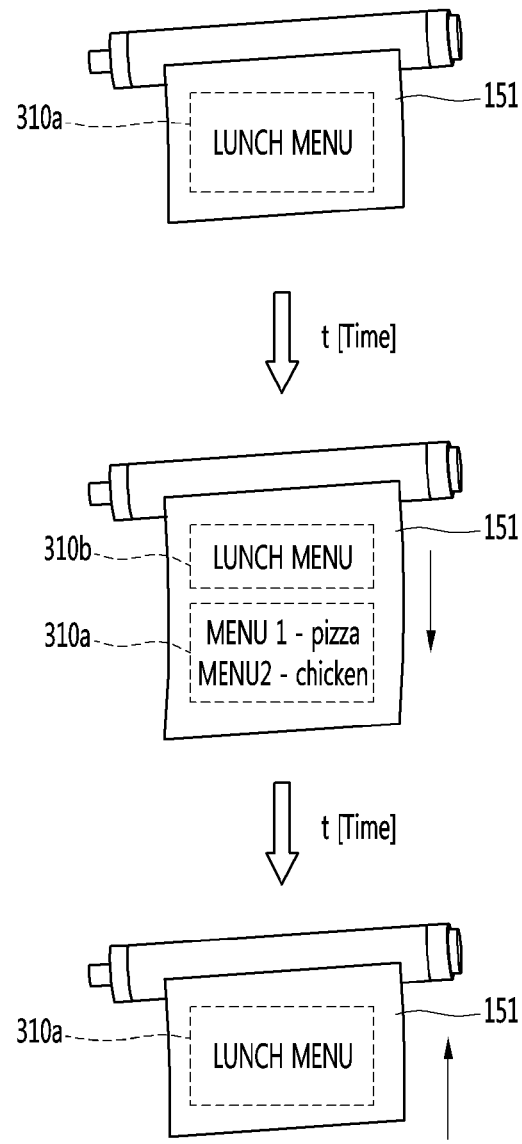
[Fig. 3]

[Fig. 4]
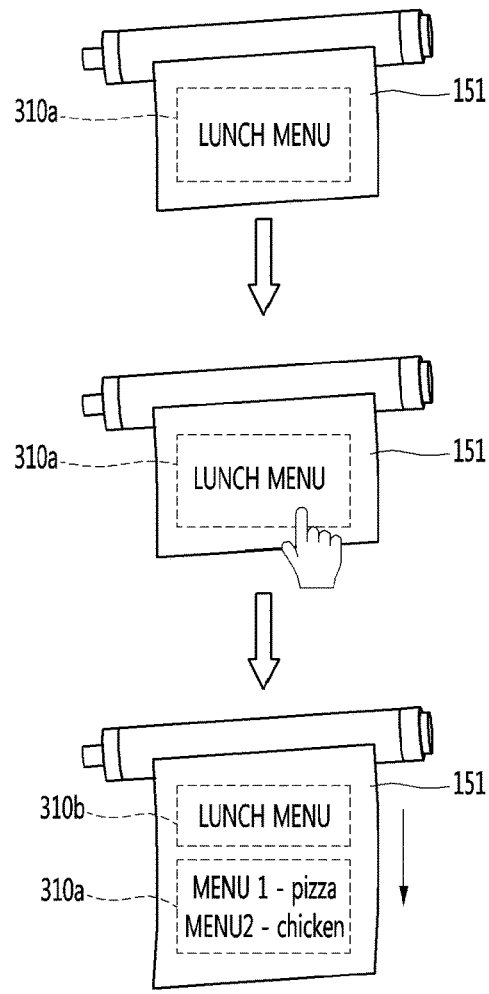
[Fig. 5a]
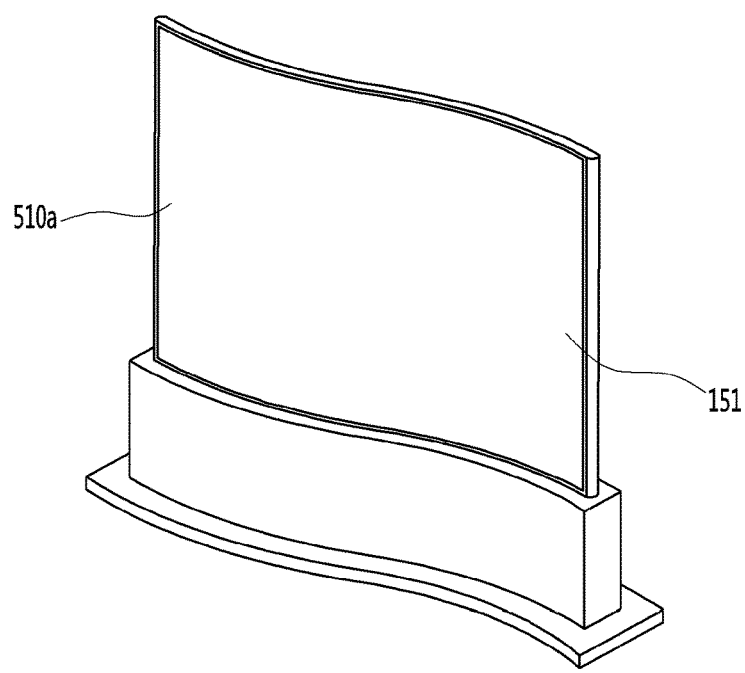

[Fig. 5b]
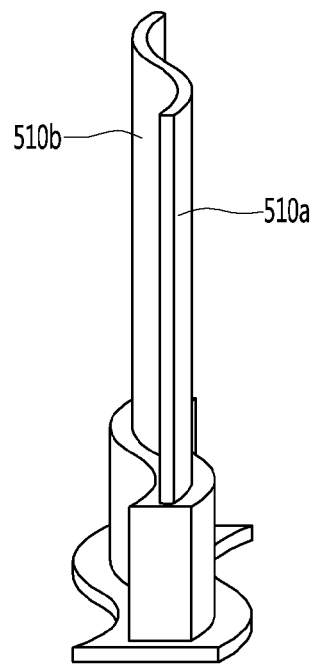
[Fig. 5c]
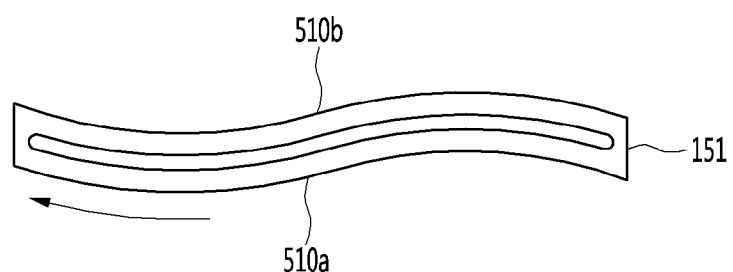

[Fig. 6]
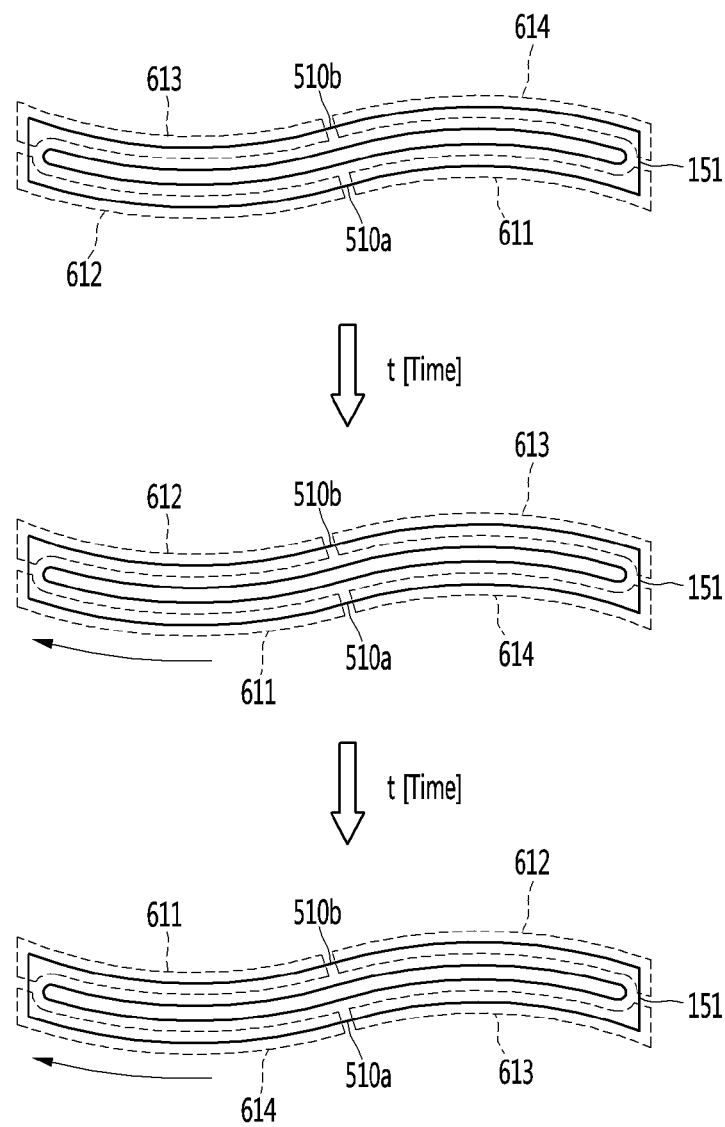

[Fig. 7]
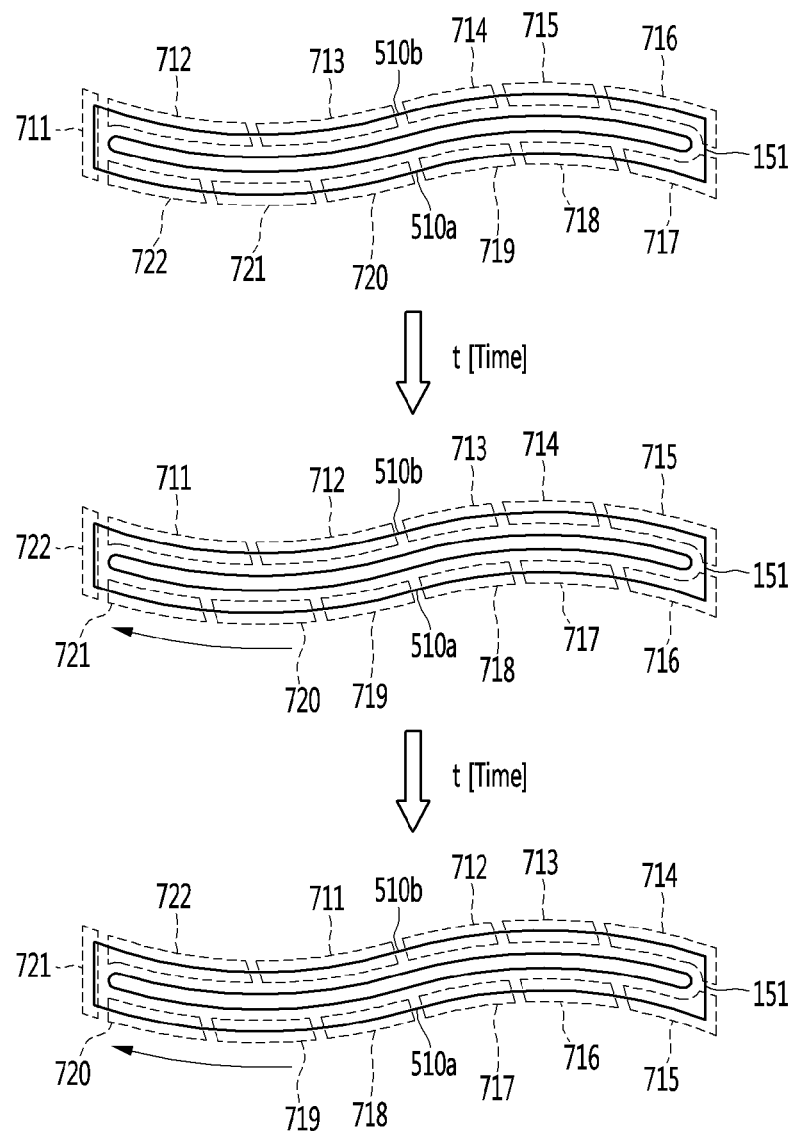

[Fig. 8a]
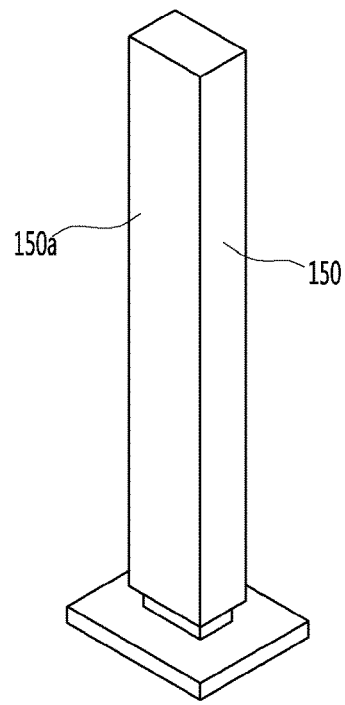
[Fig. 8b]
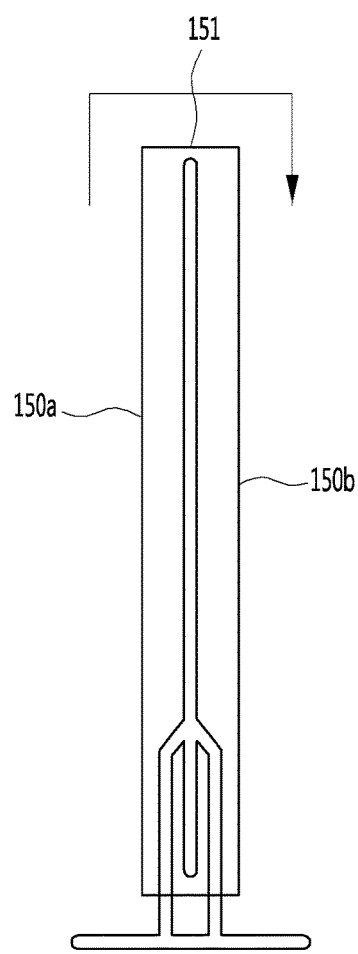

[Fig. 9]
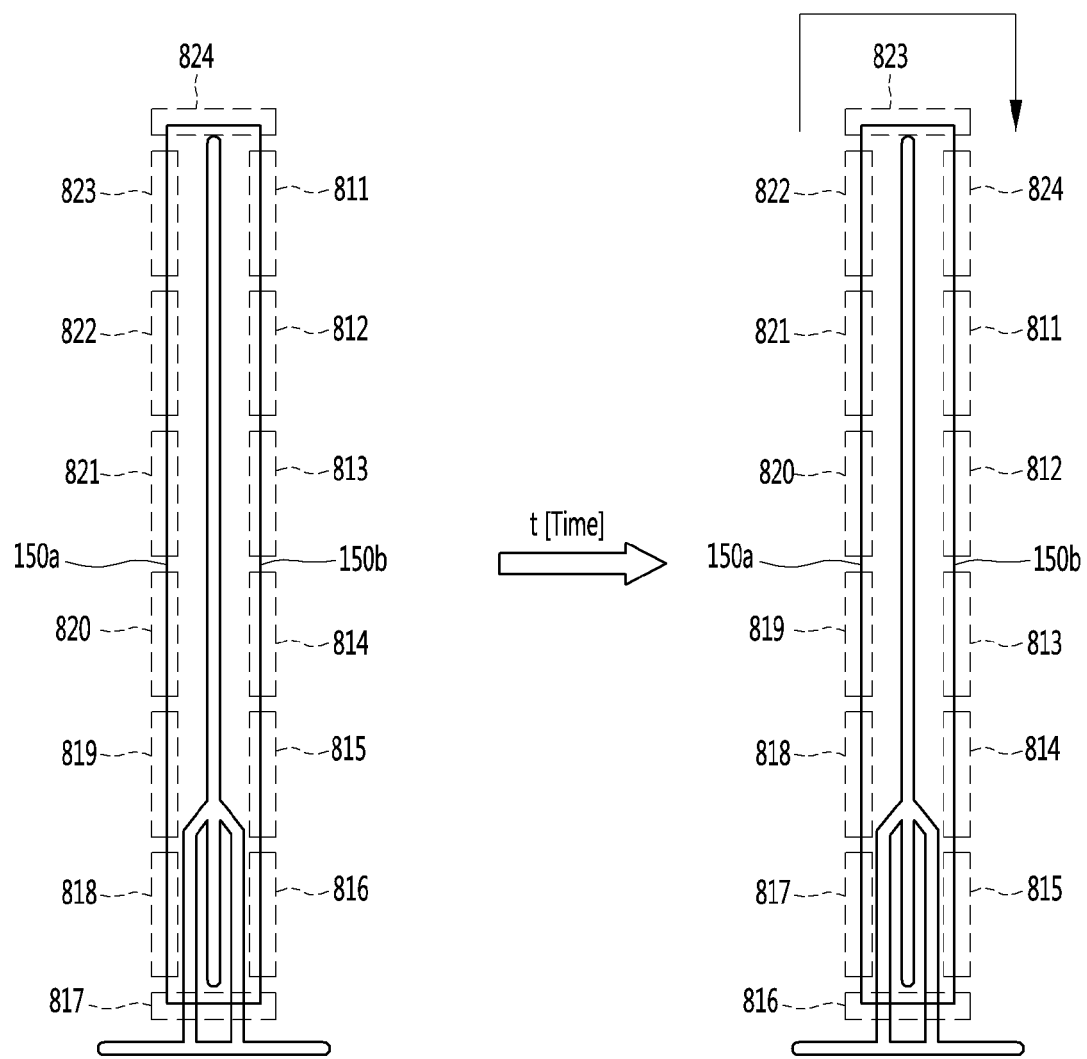

[Fig. 10a]
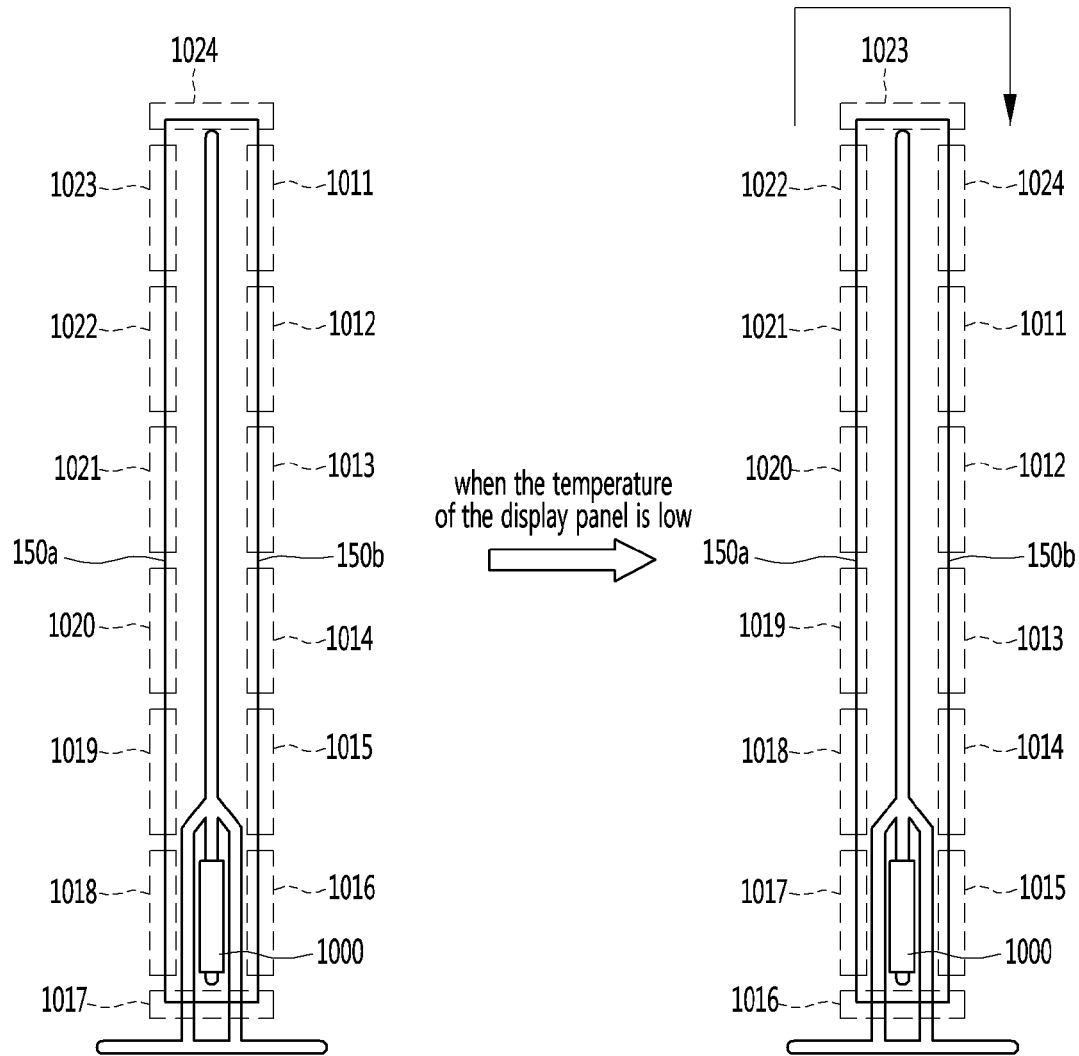

[Fig. 10b]
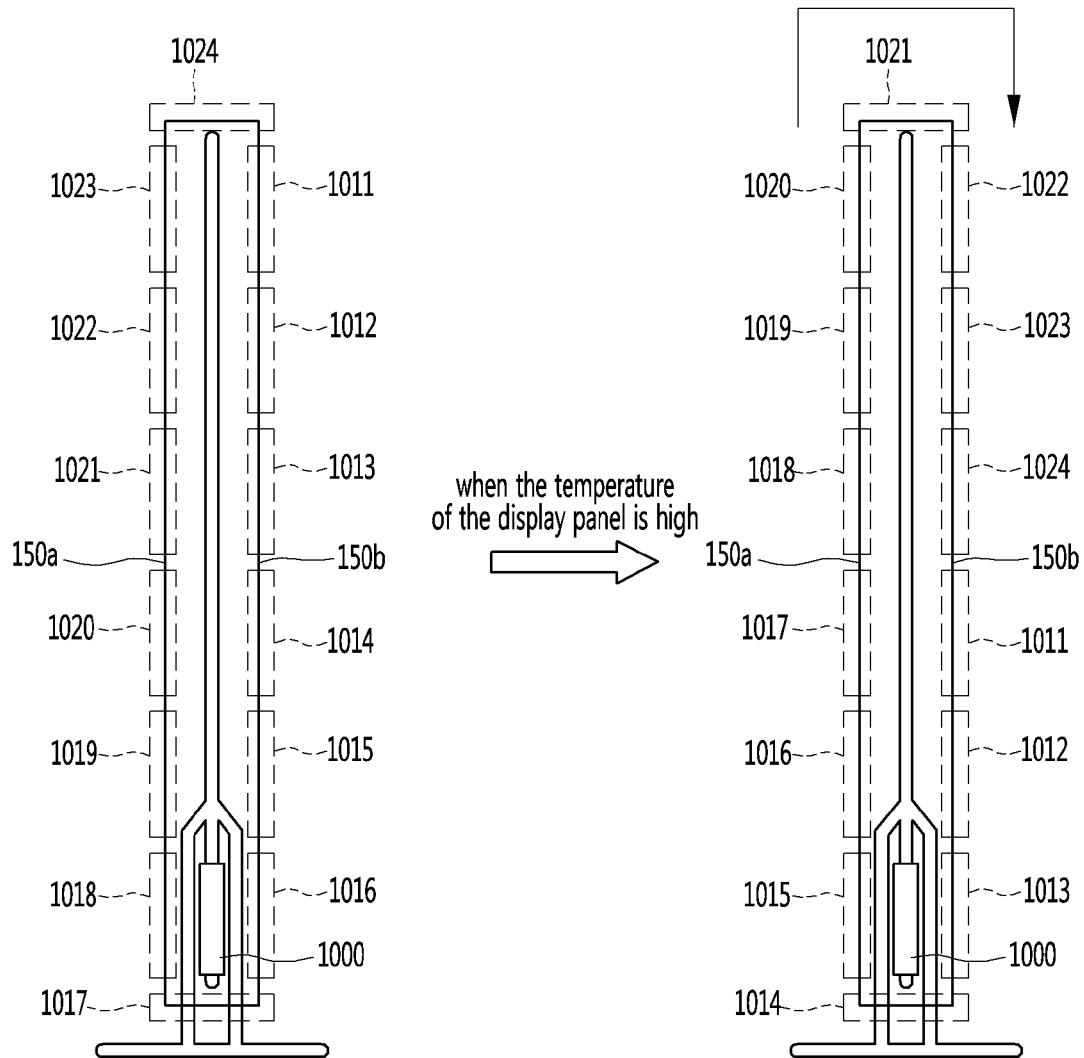

[Fig. 10c]
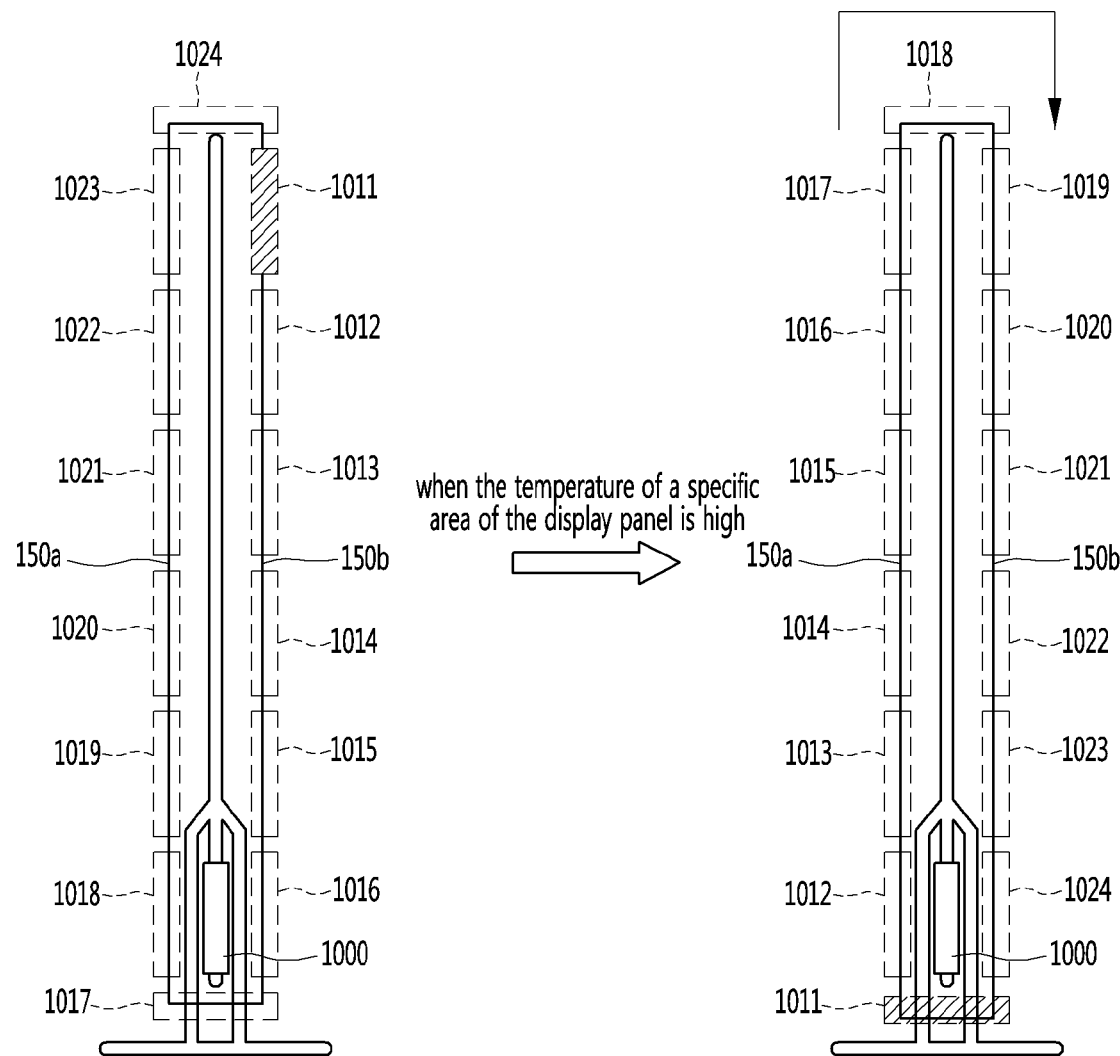

[Fig. 11a]
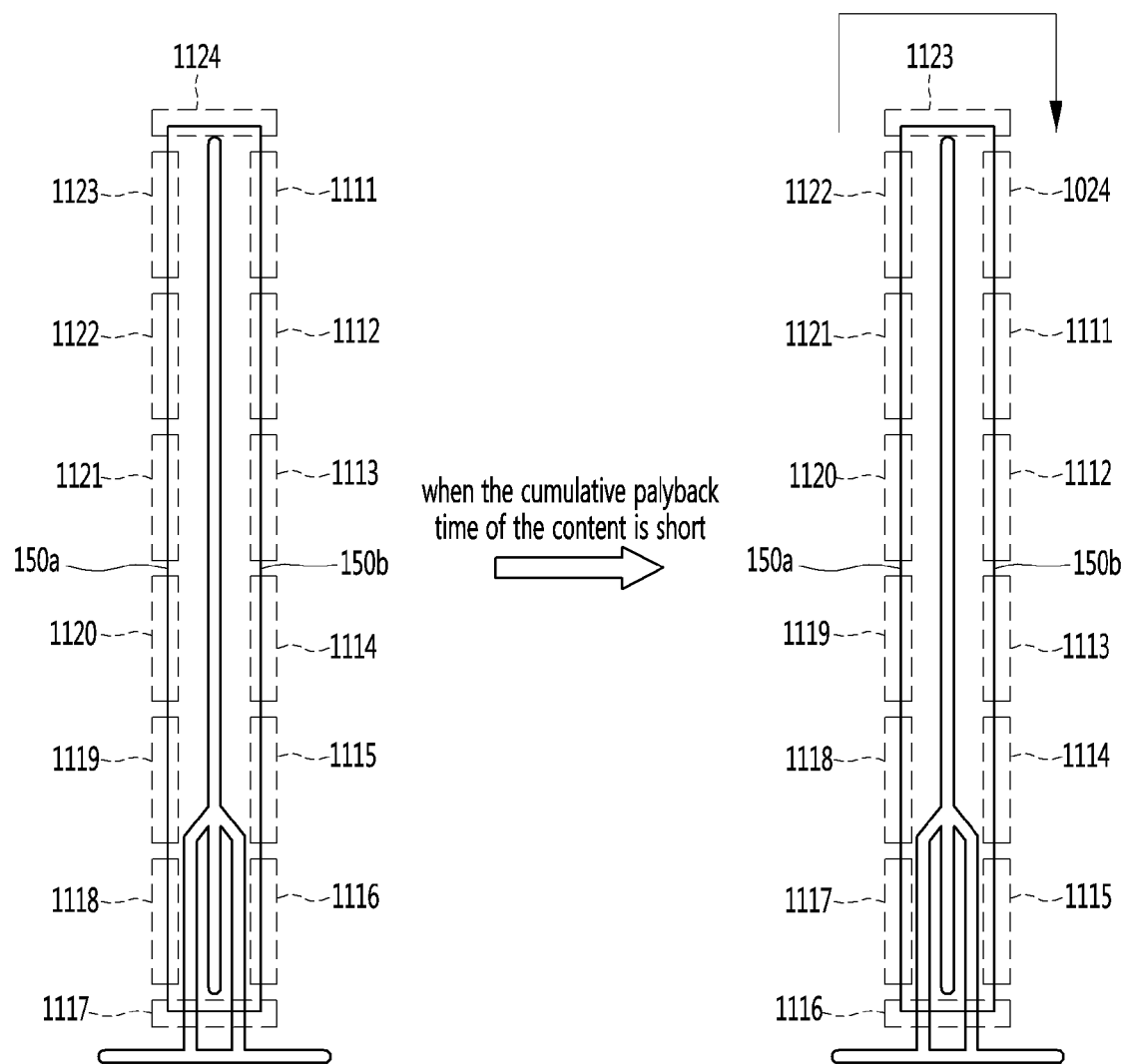

[Fig. 11b]
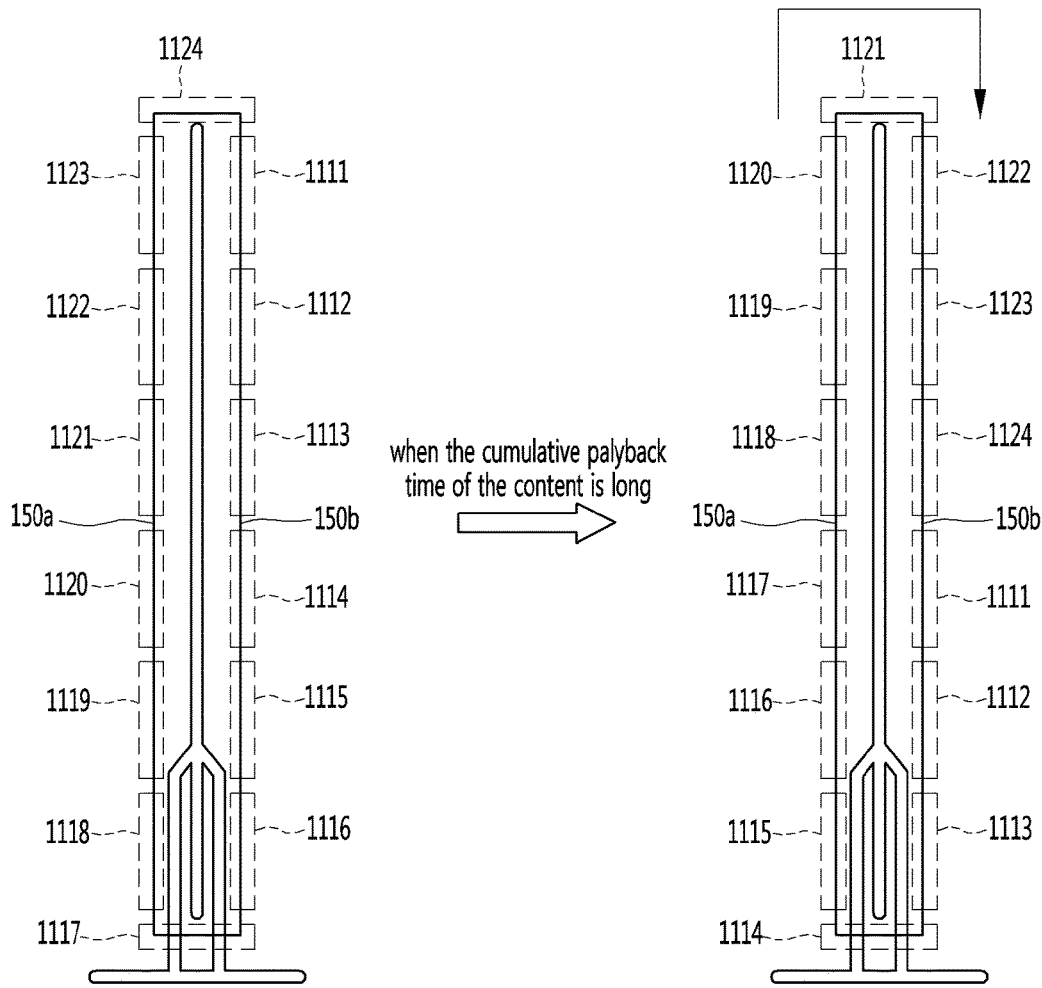
[Fig. 12a]
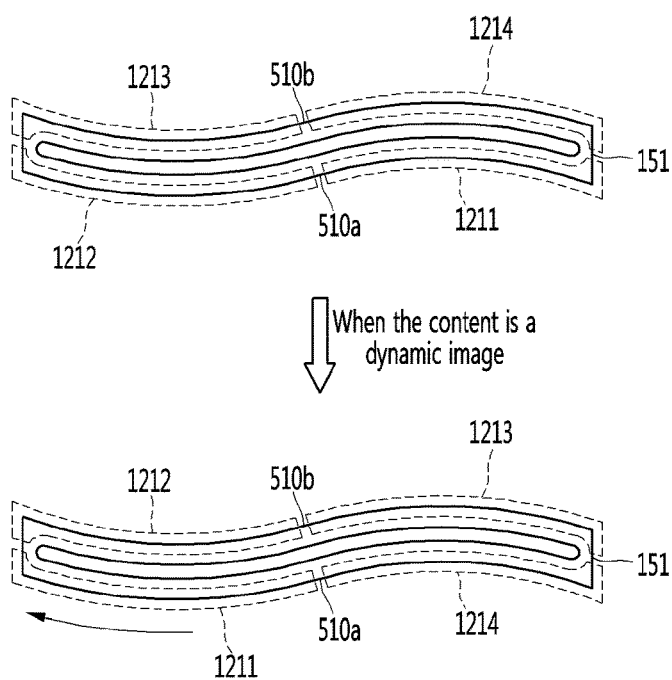

[Fig. 12b]
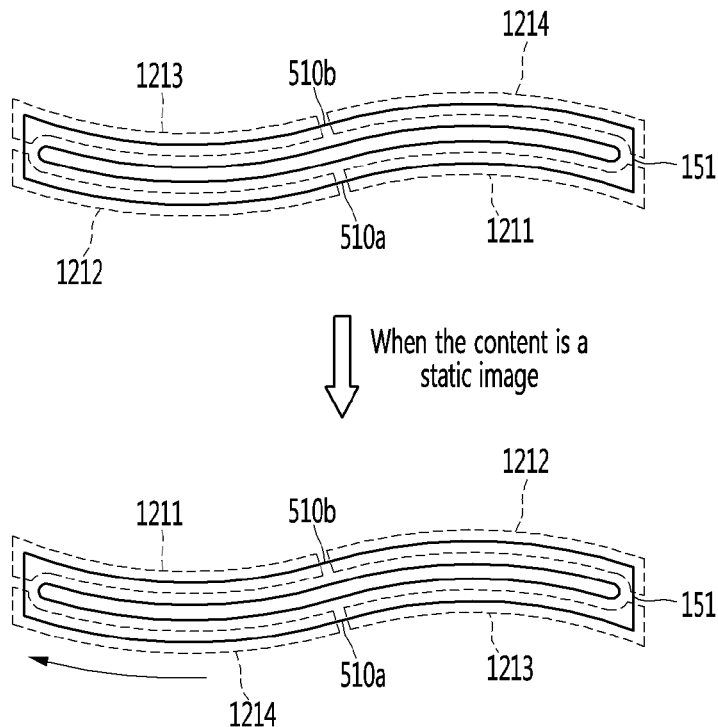
[Fig. 13a]
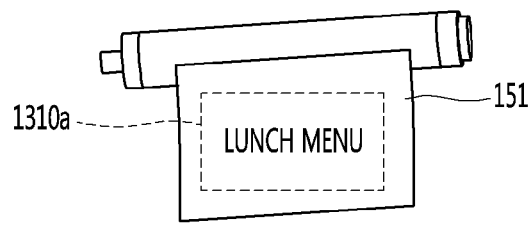
[Fig. 13b]
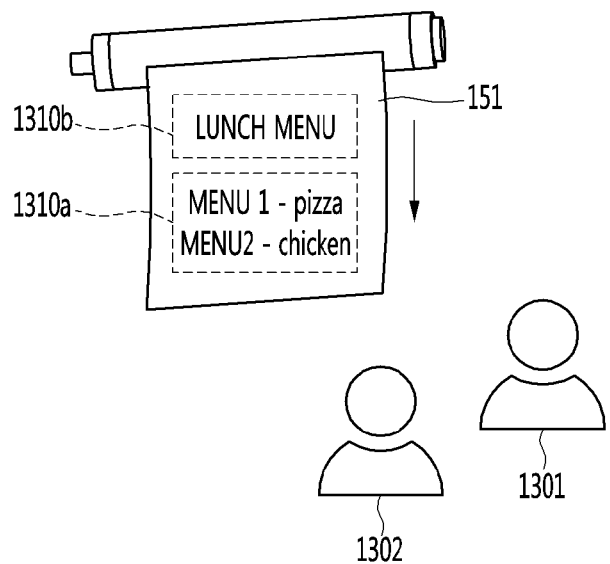

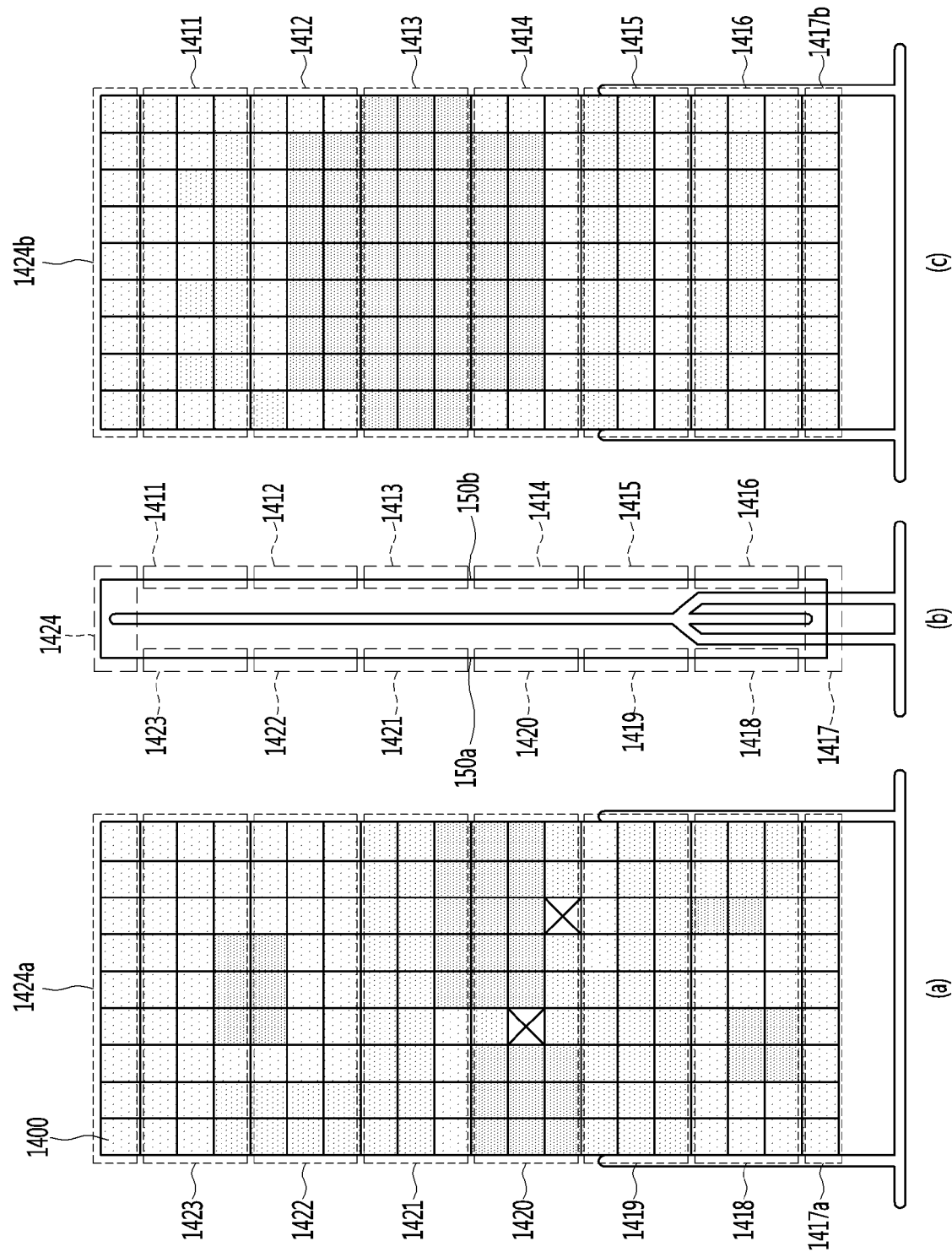
[Fig. 14]

[Fig. 15]
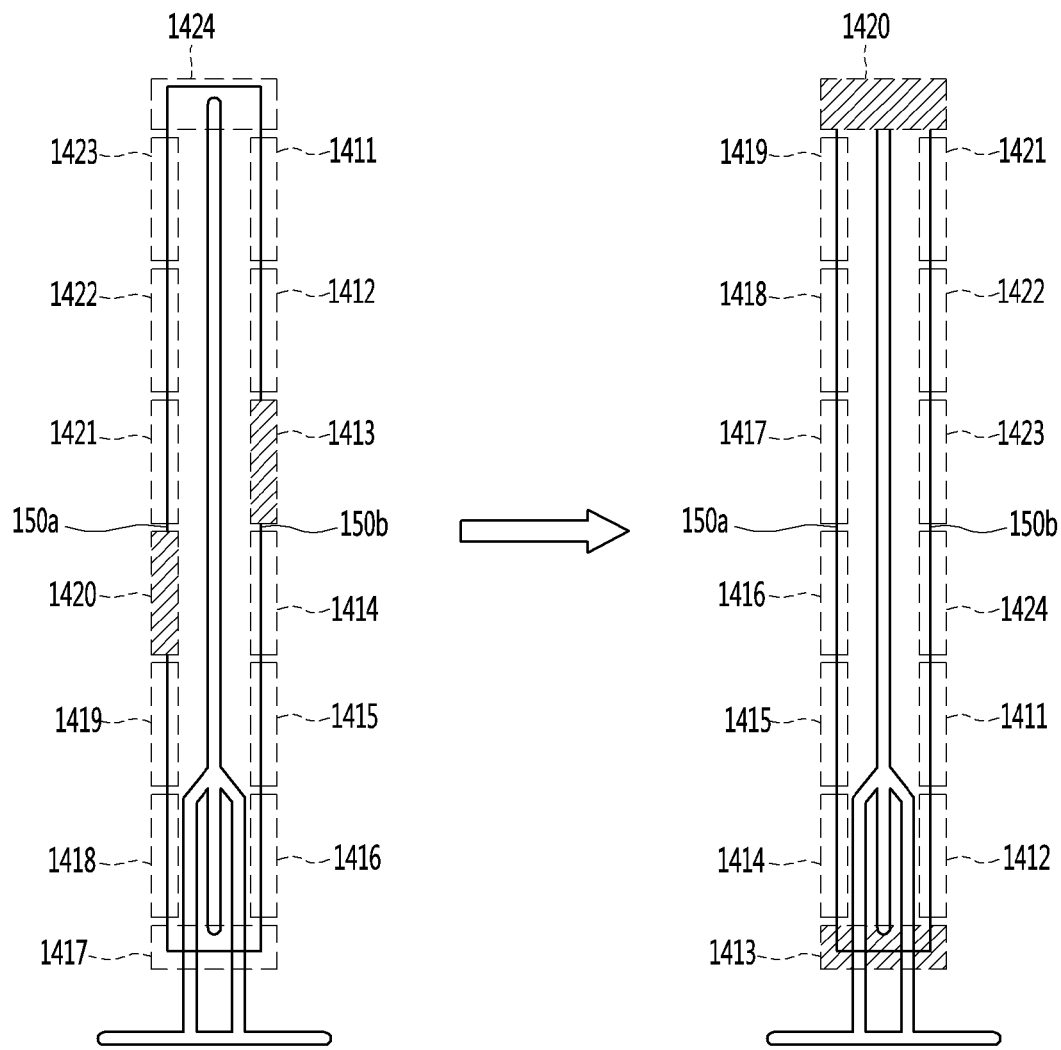

[Fig. 16a]
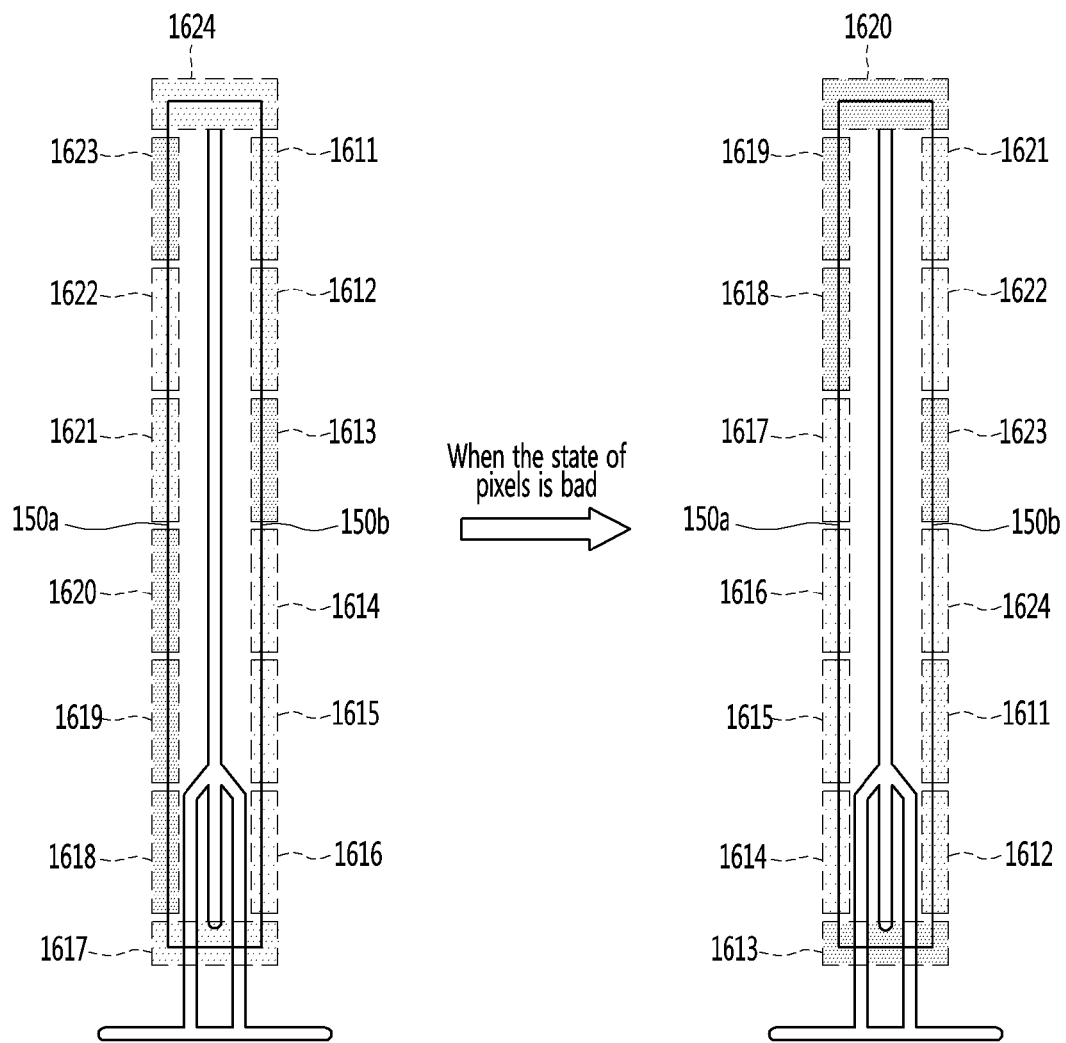

[Fig. 16b]
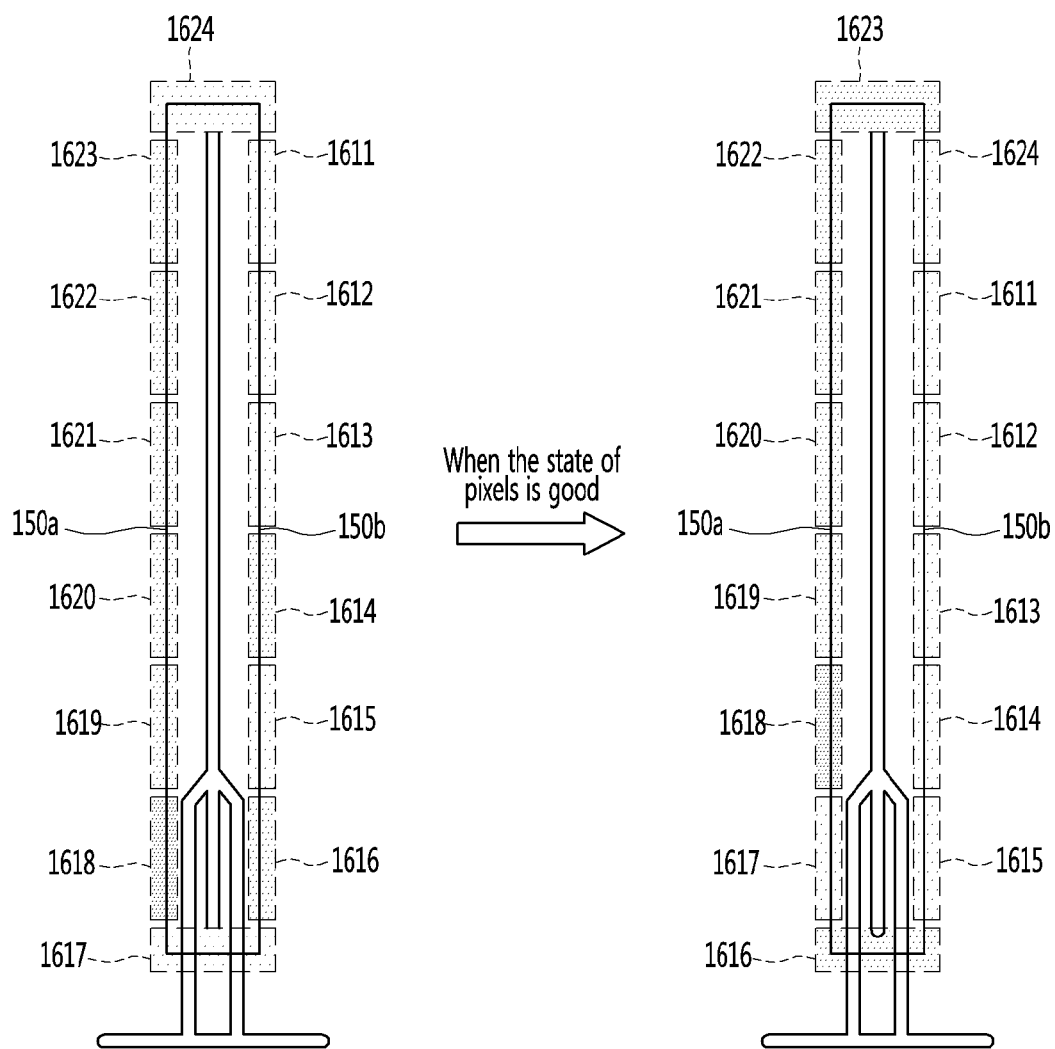

[Fig. 17]
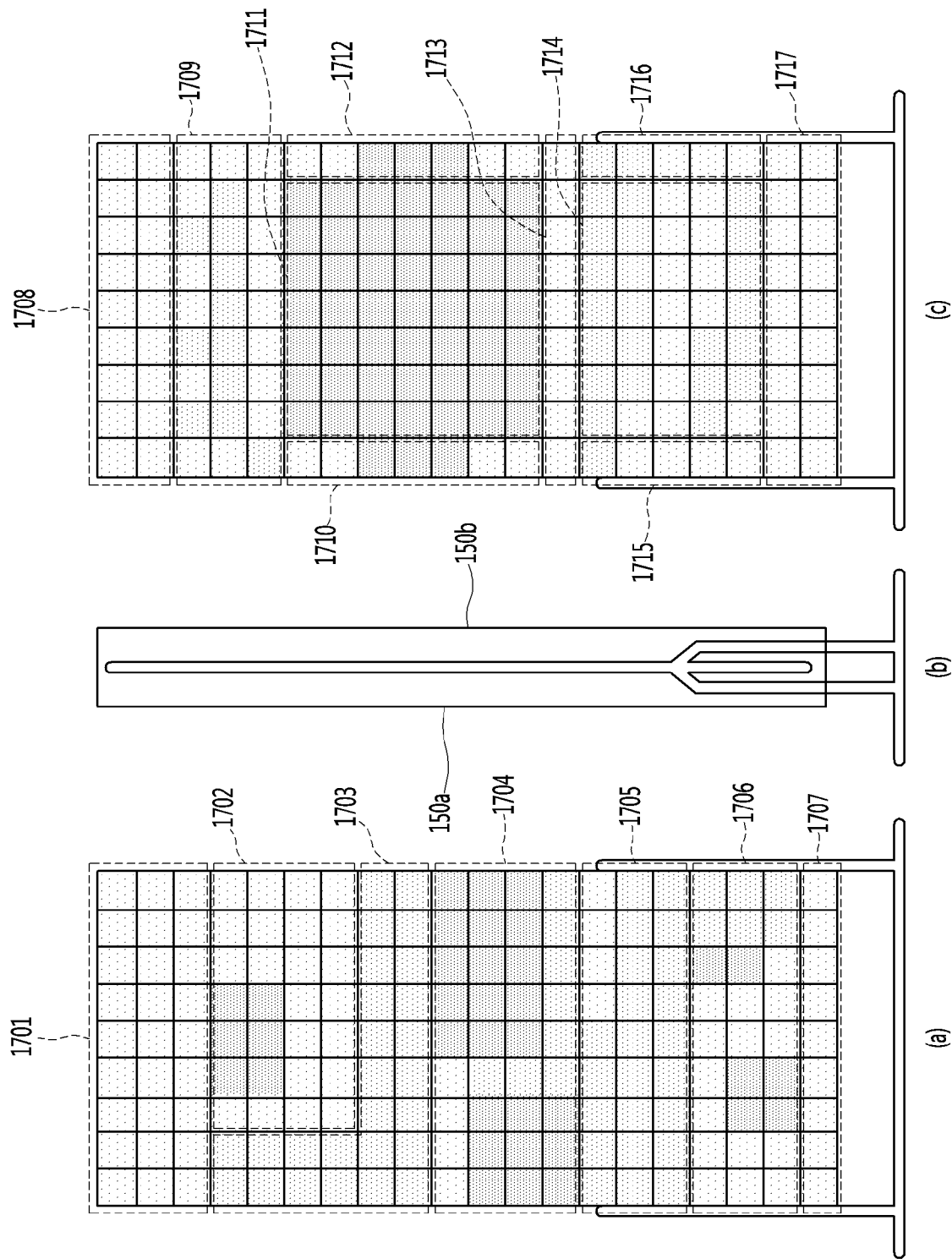

[Fig. 18]
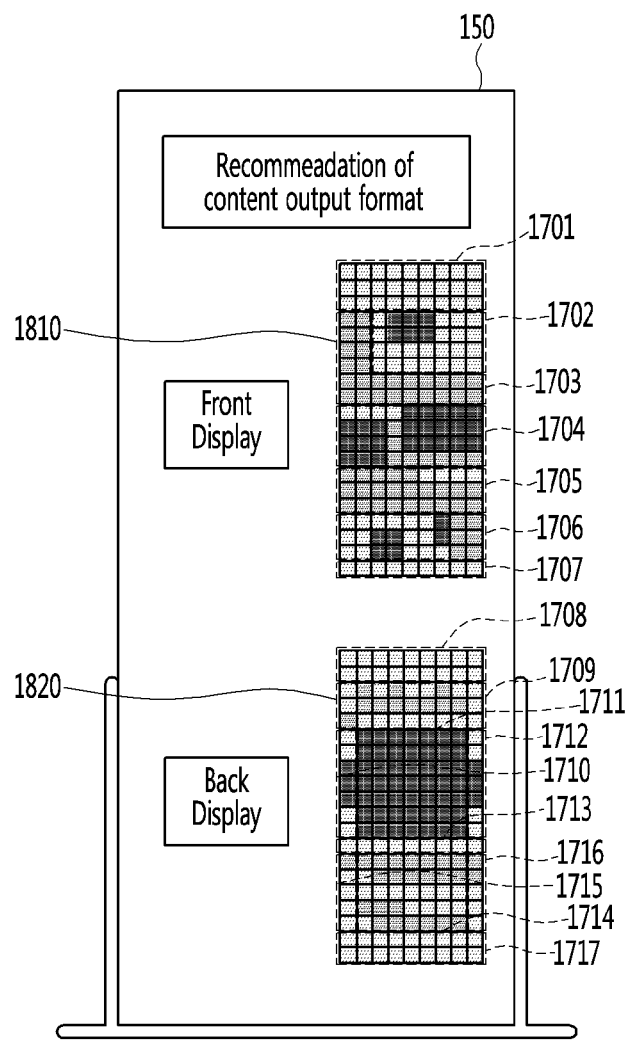

[Fig. 19]
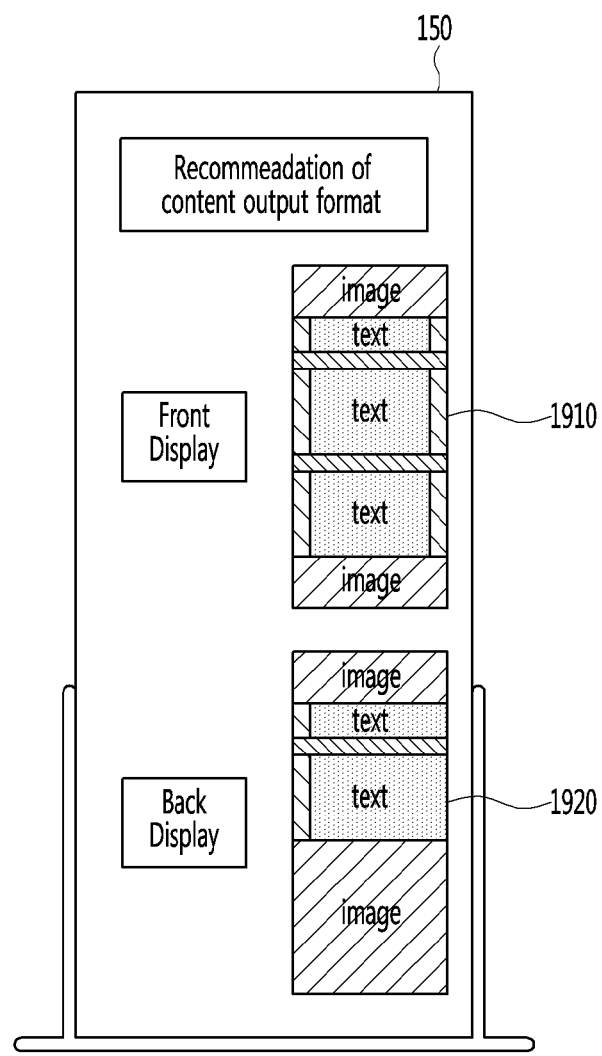

[Fig. 20]
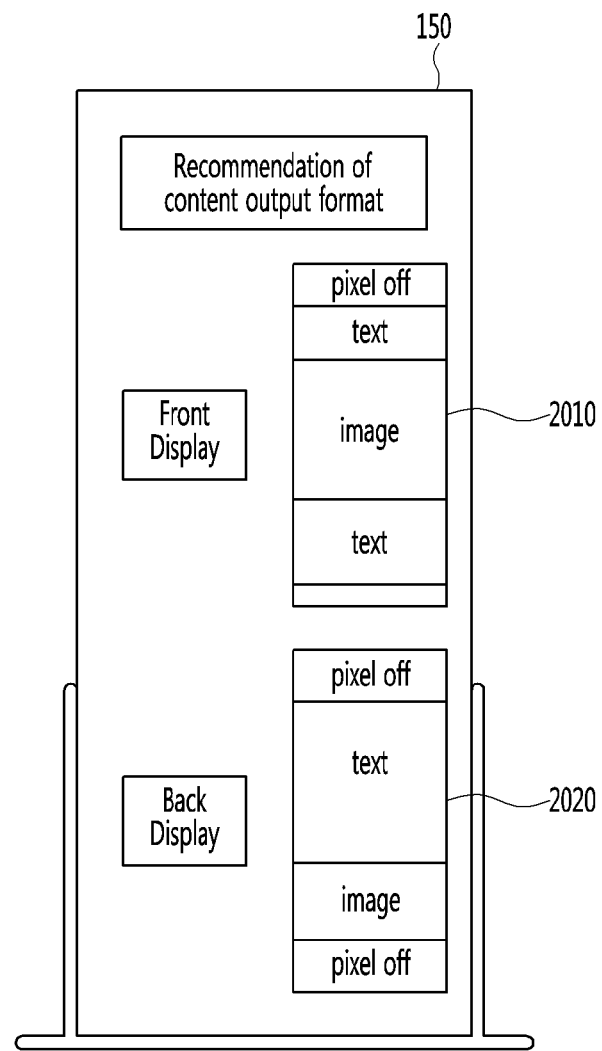

DIGITAL SIGNAGE AND OPERATING METHOD THEREOF

CROSS REFERENCE TO RELATED APPLICATIONS

This application is the National Phase of PCT/KR2017/014308 filed on Dec. 7, 2017, which claims priority under 35 U.S.C. § 119(a) to Korean Patent Application No. 10-2017-0071854 filed in the Republic of Korea on Jun. 8, 2017, all of which are hereby expressly incorporated by reference into the present application.

TECHNICAL FIELD

The present invention relates to a digital signage, and more particularly, to a digital signage and an operating method thereof, which prevent an afterimage from occurring.

BACKGROUND ART

Generally, a related art advertising method provides a leaflet including advertisement content off-line, or provides the leaflet over the Internet, televisions (TVs), or radios on-line. However, in the related art advertising method, fixed information is unilaterally provided to a user, and moreover, an owner and an author of advertisement content differ. For this reason, it is not easy to quickly correct, change, or update pre-created advertisement content. Therefore, misinformation is transferred to a user, causing misunderstanding between a user and an advertiser.

Therefore, recently, the use of display devices such as a digital signage which enables advertisement content to be easily corrected and updated and enables pieces of advertisement content to be output is increasing. However, in terms of a characteristic of the digital signage, a static picture or image is relatively frequently output. Also, since the digital signage outputs advertisement content for a long time, a possibility that an afterimage can occur is high. In the digital signage, the occurrence of an afterimage shortens a replacement cycle of a corresponding device and obstructs a sharp output of advertisement content.

DISCLOSURE OF INVENTION

Technical Problem

Accordingly, in one aspect, the present invention provides a digital signage and an operating method thereof, which minimize the occurrence of an afterimage.

In another aspect, the present invention also provides a digital signage and an operating method thereof, which move a display panel to prevent the occurrence of an afterimage.

Solution to Problem

To achieve these and other advantages and in accordance with the purpose of the present invention, as embodied and broadly described herein, the present invention provides in one aspect a digital signage including a display panel configured to display content; a controller configured to display first content in a first area of the display panel, obtain display panel control data for preventing an afterimage, based on received afterimage-related data, and move the display panel a predetermined amount and display the first content in a second area of the display panel based on the display panel control data.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

Advantageous Effects of Invention

According to an embodiment of the present invention, by moving the display panel, the occurrence of an afterimage is prevented, thereby extending a lifetime of the display panel.

According to an embodiment of the present invention, by selecting an appropriate moving direction and moving speed of the display panel according to a situation, consumption power is reduced, and moreover, the occurrence of an afterimage is prevented.

According to an embodiment of the present invention, lifetimes of elements of the display panel are uniformed. According to an embodiment of the present invention, a content output format which prevents the occurrence of an afterimage and maximizes a lifetime of the display panel is provided to a user.

BRIEF DESCRIPTION OF DRAWINGS

FIG. 1 is a block diagram illustrating a digital signage according to an embodiment of the present invention.

FIG. 2 is a flowchart illustrating an operating method of a digital signage according to an embodiment of the present invention.

FIG. 3 is a diagram illustrating an afterimage prevention method based on a movement of a display panel according to a first embodiment of the present invention.

FIG. 4 is a diagram illustrating an afterimage prevention method based on a movement of a display panel according to a second embodiment of the present invention.

FIGS. 5a to 5c are diagrams illustrating an afterimage prevention method of a digital signage including a double-sided display panel moving in a horizontal direction, according to an embodiment of the present invention.

FIGS. 6 and 7 are diagrams illustrating a method of controlling a moving speed of a display panel for preventing the occurrence of an afterimage, according to an embodiment of the present invention.

FIGS. 8a and 8b are diagrams illustrating an afterimage prevention method of a digital signage including a display panel moving in a horizontal direction, according to an embodiment of the present invention.

FIG. 9 is a diagram illustrating a moving method of a double-sided display panel moving in a vertical direction, according to an embodiment of the present invention.

FIG. 10a is a diagram illustrating a moving method of a display panel when a temperature of the display panel is low, according to an embodiment of the present invention.

FIG. 10b is a diagram illustrating a moving method of a display panel when a temperature of the display panel is high, according to an embodiment of the present invention.

FIG. 10c is a diagram illustrating a moving method of a display panel when a temperature of a specific area of the display panel is high, according to an embodiment of the present invention.

FIG. 11a is a diagram illustrating a moving method of a display panel when a cumulative playback time of content is short, according to an embodiment of the present invention.

FIG. 11b is a diagram illustrating a moving method of a display panel when a cumulative playback time of content is long, according to an embodiment of the present invention.

FIG. 12a is a diagram illustrating a moving method of a display panel when content is a dynamic image, according to an embodiment of the present invention.

FIG. 12b is a diagram illustrating a moving method of a display panel when content is a static image, according to an embodiment of the present invention.

FIG. 13a is a diagram illustrating a method of controlling, by a controller, a display panel when a person is not sensed, according to an embodiment of the present invention.

FIG. 13b is a diagram illustrating a method of controlling, by a controller, a display panel when a person is not sensed, according to an embodiment of the present invention.

FIG. 14 is a diagram illustrating pixel-based state data of a display panel according to an embodiment of the present invention.

FIG. 15 is a diagram illustrating a moving method of a display panel based on state data of a pixel, according to a first embodiment of the present invention.

FIG. 16a is a diagram illustrating a moving method of a display panel when state data of a pixel is bad, according to an embodiment of the present invention.

FIG. 16b is a diagram illustrating a moving method of a display panel when state data of a pixel is good, according to an embodiment of the present invention.

FIG. 17 is an exemplary diagram illustrating an example where a display panel is divided based on state data of a pixel, according to an embodiment of the present invention.

FIG. 18 is a diagram illustrating a method of recommending a content output format according to a first embodiment of the present invention.

FIG. 19 is a diagram illustrating a method of recommending a content output format according to a second embodiment of the present invention.

FIG. 20 is a diagram illustrating a method of recommending a content output format according to a third embodiment of the present invention.

MODE FOR THE INVENTION

Hereinafter, a digital signage system and a method of controlling the same according to an embodiment of the present invention will be described in detail with reference to the accompanying drawings. The accompanying drawings are only exemplary and not intended to assert or imply any limitation with regard to the present invention.

In addition, the same or similar portions are denoted by the same reference numerals and a repeated description thereof will be omitted. For convenience of description, the sizes and shapes of the components may be exaggerated or reduced. Although the terms first, second, etc. may be used herein to describe various elements, these elements should not be limited by these terms. These terms are only used to distinguish one element from another. The suffixes "module" and "unit" of elements herein are used for convenience of description and thus can be used interchangeably.

Although the terms used in the present invention are selected from generally known and used terms, terms used herein may be varied depending on operator's intention or customs in the art, appearance of a new technology, or the like. In addition, some of the terms mentioned in the description of the present invention have been selected by the applicant at his or her discretion, the detailed meanings of which are described in relevant parts of the description herein.

For example, in the present invention, the term "digital signage" described in this specification may be used to collectively refer to display advertisement boards for delivering information and advertisements by combining various IT technologies such as hardware, software, content and networks. Such a digital signage can be mounted on large buildings or places with a large floating population, such as terminals, public offices, bus stops, department stores, subways, airports, hotels, hospitals or public places where persons stay for predetermine times, such as elevators, theaters, restaurants, shopping malls or shops.

As a digital signage, a stand-alone digital signage may configure a signboard or billboard using a digital information display such as a plasma display panel (PDP), a liquid crystal display (LCD), a light emitting diode (LED), etc., store pre-created information and advertisement content in a memory, and manually reproduce the information and advertisement content. As another digital signage, a networked digital signage may transmit information and advertisement content to a digital information display through a communication network and perform content transmission and device state management at the center thereof. Such a digital signage is an example of a display device. Hereinafter, in some instances, the digital signage and the display device may be used interchangeably.

Such a digital signage is an intelligent network TV capable of supporting at least one of, for example, a broadcast reception function, a computer support function and the Internet function and may include various interfaces such as a handwriting type input device, a touchscreen or a pointing device. Such a display device can support a wired or wireless networking and perform e-mailing, web-browsing, banking or gaming through connection with the Internet and/or other digital devices. Also, the display device can use a general-purpose OS standardized to support the above-described functions. Accordingly, the display device can freely add or delete various applications on the general-purpose OS kernel to perform more user-friendly functions.

Hereinafter, various embodiments of the present invention will be described in detail with reference to the accompanying drawings. However, this is merely exemplary for convenience of description and better understanding of the present invention and the scope of the present invention is not limited or restricted by the embodiments.

First, FIG. 1 is a block diagram illustrating a digital signage 100 according to an embodiment of the present invention. As shown, the digital signage 100 includes an image input unit 110, an image processor 120, a buffer memory 130, a display driver 140, a display unit 150, a key input unit 160, a memory 170, an on-screen display (OSD) processing unit 180, and a controller 190.

The image input unit 110 can receive an image signal R, G, and B and perform digital image signal processing (digital R, G, and B) on the image signal R, G, and B. For example, the image input unit 110 can receive content which is to be displayed on a screen. The image processor 120 can store the image signal, input through the image input unit 110, in the buffer memory 120 and perform image processing (scaling, etc.) in order for the image signal to be suitable for a format of the display unit 150.

The buffer memory 130 can receive the image signal, input to the image input unit 110, through the image processor 120. The buffer memory 130 can also store an image based on the image signal in units of one frame. Further, the display driver 140 can receive the image signal output from the image processor 120 to output a driving signal which drives the display unit 150 to display an image.

The display unit 150 can also display a corresponding image according to the driving signal of the display driver 140. The display unit 150 may include an organic light emitting diode (OLED) panel. That is, the display unit 150 may include a display panel including a fluorescent organic compound which self-emits light.

In addition, the display unit 150 may be implemented as one type of a double-sided signage, a rollable signage, a swivel signage, a one-sided signage, and a type and a driving method may be changed based on the type of the display unit 150. The display unit 150 may be divided into a display panel 151, which displays a screen, and a bezel that protects the display panel 151. The display panel 151 displays content.

The key input unit 160 is for receiving a user input command and may include a remote controller, a mouse, a keyboard, a keypad, and/or the like. In addition, a data obtain unit 165 can receive afterimage-related data from the outside or the inside of the digital signage 100.

Here, the afterimage-related data includes data used to prevent an afterimage from being displayed on a screen of the digital signage 100. In more detail, the afterimage-related data may include data associated with a cause of an afterimage and control data for preventing the occurrence of an afterimage based on a cause of the afterimage. The afterimage-related data will be described below in detail.

In addition, the memory 170 can store one or more of data associated with an overall operation of the digital signage 100, data associated with prevention of an afterimage received through the data obtain unit 165, and the user input command input through the key input unit 160. An OSD processing unit 180 performs processing for displaying an internal menu, which prevents a screen afterimage, on the display unit 150. The controller 190 can overall control the digital signage 100. The controller 190 can also control a content output operation of the display unit 150 and an operation of preventing an afterimage of a screen.

Hereinafter, an operating method of preventing, by the digital signage 100, the occurrence of an afterimage of a screen will be described. In particular, FIG. 2 is a flowchart illustrating an operating method of a digital signage according to an embodiment of the present invention.

In operation S101, the image input unit 110 receives content which is to be displayed, and the digital signage can display one or more pieces of content. Thus, the image input unit 110 of the digital signage 100 can receive the content which is to be displayed. The image input unit 110 can also receive the content from the outside. In more detail, the image input unit 110 can receive the content from an external input interface such as a server, a control device for controlling the digital signage 100, a universal serial bus (USB), or the like. The content may include one or more of a text, a static image, a dynamic image, and a sound.

In addition, the image input unit 110 can transfer the received content. In more detail, the content received through the image input unit 110 may be image-processed by the image processor 120, and the image-processed content can be displayed on the display unit 150. The data obtain unit 165 can receive afterimage-related data in operation S103.

The afterimage-related data may be a data associated with an afterimage occurring in a screen and may include data associated with a cause of the afterimage and data associated with a method of preventing the occurrence of the afterimage. As an detailed example, the afterimage-related data includes the kind of a display unit such as a rollable display, a double-sided display, or a one-sided display, the kind of displayed content such as a temperature, a text, a static image, or a dynamic image of the display panel, a cumulative playback time of the content, an ambient brightness of the display unit, whether a user touch input is received or not, and whether a person is located or not in an area adjacent to the digital signage 100.

The data obtain unit 165 can receive one or more of the above-listed afterimage-related data. Further, the controller 190 can obtain display panel control data, based on the received afterimage-related data in operation S105. The controller 190 can also control the display panel 151 for minimizing a possibility of occurrence of an afterimage, based on the received afterimage-related data. For example, the controller 190 can select one method from among an ISM method of lowering a brightness of a screen according to a viewing time, an orbiter method of finely moving a screen, a white wash method of initializing a screen, an inversion method of inverting a color into a complementary color at every predetermined period, and a method of moving the display panel 151 and control the display panel 151.

Hereinafter, a method of moving the display panel 151 to prevent an afterimage will be described in detail. In particular, the controller 190 can obtain display panel control data for moving the display panel 151, based on afterimage-related data. Here, the display panel control data includes data for controlling a moving direction, a moving speed (a moving distance per hour or a moving area per hour), a moving time, etc. of the display panel 151.

In addition, the controller 190 can determine an appropriate moving direction and moving distance of the display panel 151 for preventing an afterimage, based on the kind of the display unit and the kind of content which are afterimage-related data. In this instance, despite using the same digital signage, the display panel 151 can be differently controlled based on a use environment and a user condition of the digital signage, thereby minimizing a possibility of occurrence of an afterimage.

In operation S107, the controller 190 can control a movement of the display panel 151, based on the display panel control data. In particular, the controller 190 can control the display panel 151 according to the display panel control data obtained based on the afterimage-related data.

Hereinafter, a method of moving the display panel 151 based on afterimage-related data to prevent an afterimage according to various embodiments of the present invention will be described. In particular, FIG. 3 is a diagram illustrating an afterimage prevention method based on a movement of a display panel according to a first embodiment of the present invention.

According to the first embodiment of the present invention, the controller 190 can periodically roll up or down the display panel 151 to prevent the occurrence of an afterimage. In more detail, when the display unit 150 is a rollable display, the display panel 151 may be rolled up or down. That is, the display panel 151 may be rolled up or down in order for a screen to be narrowed or widened.

The display panel 151 may include a first area 310a when rolled up, and include the first area 310a and a second area 310b when rolled down. That is, when the display panel 151 is rolled up and when the display panel 151 is rolled down, the display panel 151 can include the same first area 310a.

When the display panel 151 is rolled up, the controller 190 can perform control so that content displayed on the first area 310a when the display panel 151 is rolled up differs from content displayed on the first area 310a when the display panel 151 is rolled down, thereby preventing the occurrence of an afterimage. That is, the controller 190 can change content displayed on the first area 310a according to a movement of the display panel 151, in order for the same content not to be displayed on the first area 310a.

Referring to an example illustrated in FIG. 3, the controller 190 can roll up or down the display panel 151 at every predetermined period t. In addition, the controller 190 can display first content on the first area 310a when the display panel 151 is rolled up.

When a predetermined time t elapses, the controller 190 can roll down the display panel 151, display second content on the first area 310a, and display third content on the second area 310b. That is, the controller 190 can display other content on the first area 310a according to a movement of the display panel 151. The third content displayed on the second area 310b may be the same as or different from the first content.

When the predetermined time t elapses in a rolled-down state, the controller 190 can roll up the display panel 151 and can display the first content on the first area 310a. Content displayed on the first area 310a may be the first content which is content which is just previously displayed in a rolled-up state, or may be fourth content. As described above, the controller 190 can perform control in order for the same content to be continuously displayed on the same area when the display panel 151 is rolled up or down, thereby preventing the occurrence of an afterimage.

Next, FIG. 4 is a diagram illustrating an afterimage prevention method based on a movement of a display panel according to a second embodiment of the present invention. According to the second embodiment of the present invention, the controller 190 can roll up or down the display panel 151 according to a user input command to prevent the occurrence of an afterimage.

In more detail, the display panel 151 may include a first area 310a in a roll-up state. The controller 190 can perform control to display first content on the first area 310a. The controller 190 can then receive the user input command when the first content is displayed. Here, the user input command includes a command which is input by touching the first content, a command for rolling down the display panel 151, and a command for selecting one area of the first content, but this is merely an example.

When the user input command is received while the first content is displayed, the controller 190 can roll down the display panel 151. As discussed above, the display panel 151 may include the first area 310a and a second area 310b according to the display panel 151 being rolled down. The controller 190 can perform control so that second content is displayed on the first area 310a and the first content or third content is displayed on the second area 310b.

As described above, when there is no user input command, the controller 190 can allow the first content to be displayed on the first area 310a, and when the user input command is received, the controller 190 can allow the second content to be displayed on the first area 310a while displaying the first content on the second area 310b. Accordingly, power which is consumed by unnecessarily displaying content on a wide area when there is no user is reduced, and the occurrence of an afterimage is prevented.

Next, FIGS. 5a to 5c are diagrams illustrating an afterimage prevention method of a digital signage including a double-sided display panel moving in a horizontal direction, according to an embodiment of the present invention. In more detail, FIG. 5a is a perspective view of a digital signage 100 including a double-sided display panel moving in a horizontal direction, FIG. 5b is a side view of the digital signage 100 including the double-sided display panel moving in the horizontal direction, and FIG. 5c is a horizontal-direction cross-sectional view of the digital signage 100 including the double-sided display panel moving in the horizontal direction.

Referring to FIGS. 5a to 5c, the digital signage 100 including the double-sided display panel moving in the horizontal direction may include a first area 510a and a second area 510b. The first area 510a and the second area 510b may respectively be a front area and a rear area, or vice versa. As illustrated in FIG. 5c, the display panel 151 can move clockwise, but this is merely an example. In other embodiments, the display panel 151 can move counterclockwise. Hereinafter, for convenience of description, the display panel 151 moving clockwise will be described as an example.

The controller 190 can perform control to display content while moving the display panel 151 and moving the content in a direction opposite to a moving direction of the display panel 151. Therefore, the content can be displayed on a fixed area, or the display panel 151 can display different pieces of content according to the elapse of time, thereby lowering a probability of occurrence of an afterimage.

The controller 190 can determine a moving speed and a moving direction of the display panel 151, based on afterimage-related data. That is, the digital signage according to an embodiment of the present invention can obtain display panel control data appropriate for various situations such as a temperature and a content cumulative playback time of the display panel 151, thereby reducing consumption power and minimizing obstruction of convent viewing to prevent the occurrence of an afterimage.

Next, FIGS. 6 and 7 are diagrams illustrating a method of controlling a moving speed of a display panel for preventing the occurrence of an afterimage, according to an embodiment of the present invention. Referring to FIG. 6, the display panel 151 may be divided into a first panel part 611, a second panel part 612, a third panel part 613, and a fourth panel part 614.

The first panel part 611 and the second panel part 612 can display first content corresponding to a first area 510a, and the second panel part 613 and the fourth panel part 614 can display second content corresponding to a second area 510b. The first content may be the same as or different from the second content.

When the first panel part 611 and the second panel part 612 continuously display the first content and the third panel part 613 and the fourth panel part 614 continuously display the second content, an afterimage occurs. When a predetermined time t elapses, the controller 190 can move the display panel 151. In more detail, the controller 190 can move the first panel part 611 to a previous position of the second panel part 612, move the second panel part 612 to a previous position of the third panel part 613, move the third panel part 613 to a previous position of the fourth panel part 614, and move the fourth panel part 614 to a previous position of the first panel part 611. Accordingly, the controller 190 can perform control so that the fourth panel part 614 and the first panel part 611 display the first content corresponding to the first area 510a, and the second panel part 612 and the third panel part 613 display the second content corresponding to the second area 510b.

Subsequently, when the predetermined time t elapses, the controller 190 can move the first panel part 611 to a previous position of the second panel part 612, move the second panel part 612 to a previous position of the third panel part 613, move the third panel part 613 to a previous position of the fourth panel part 614, and move the fourth panel part 614 to a previous position of the first panel part 611. Accordingly, the controller 190 can perform control so that the fourth panel part 614 and the third panel part 613 display the first content, and the second panel part 612 and the first panel part 611 display the second content.

Therefore, since the first to fourth panel parts 611 to 614 display content which is changed at every predetermined period, the occurrence of an afterimage is prevented. When the display panel 151 moves at every certain period, content may be unnaturally displayed, or viewing of content by a user may be obstructed. Accordingly, when a possibility of occurrence of an afterimage caused by afterimage-related data is low, the controller 190 can perform control in order for a moving speed of the display panel 151 to become slow. A possibility of occurrence of an afterimage is low can be when content is a dynamic image or when a temperature of the display panel is low, but this is merely an example and will be described below in more detail.

First, a method of controlling, via the controller 190, the display panel 151 when a moving speed of the display panel 151 is slow will be described with reference to FIG. 7. As a moving speed of the display panel 151 becomes slower, the controller 190 can divide the display panel 151 into a greater number of panel parts. In more detail, in the embodiment of FIG. 7, the display panel 151 can be divided into a first panel part 711, a second panel part 712, a third panel part 713, a fourth panel part 714, a fifth panel part 715, a sixth panel part 716, a seventh panel part 717, an eighth panel part 718, a ninth panel part 719, a tenth panel part 720, an eleventh panel part 721, and a twelfth panel part 722. However, this is merely an example. In other embodiments, the controller 190 can divide the display panel, based on a moving speed of the display panel determined in display panel control data.

The seventh to twelfth panel parts 717 to 722 can display first content corresponding to a first area 510*a*, and the second to sixth panel parts 712 to 716 can display second content corresponding to a second area 510*b*. When a predetermined time t elapses, the controller 190 can move the display panel 151.

In more detail, the controller 190 can move the first panel part 711 to a previous position of the second panel part 712, move the second panel part 712 to a previous position of the third panel part 713, move the third panel part 713 to a previous position of the fourth panel part 714, move the fourth panel part 714 to a previous position of the fifth panel part 715, move the fifth panel part 715 to a previous position of the sixth panel part 716, move the sixth panel part 716 to a previous position of the seventh panel part 717, move the seventh panel part 717 to a previous position of the eighth panel part 718, move the eighth panel part 718 to a previous position of the ninth panel part 719, move the ninth panel part 719 to a previous position of the tenth panel part 720, move the tenth panel part 720 to a previous position of the eleventh panel part 721, move the eleventh panel part 721 to a previous position of the twelfth panel part 722, and move the twelfth panel part 722 to a previous position of the first panel part 711.

Accordingly, the controller 190 can perform control so that the sixth to eleventh panel parts 716 to 721 display the first content, and the first to fifth panel parts 711 to 715 display the second content. When the predetermined time t elapses, the controller 190 can move the display panel 151 in a manner similar to the above-described manner. Based on a movement of the display panel 151, the controller 190 can perform control so that the fifth to tenth panel parts 715 to 720 display the first content, and the first to fourth panel parts 711 to 714 display the second content. As described above, the controller 190 can perform control to reduce a moving speed of the display panel 151, thereby preventing the occurrence of an afterimage without obstructing viewing of content by a user as much as possible.

As illustrated in FIG. 7, if divided areas of the display panel 151 are subdivided, there can be an area on which content is not displayed. For example, a side area of the display panel 151 may not display content. The controller 190 can turn off a pixel corresponding to a panel part (711, 712, and 713 in FIG. 7) disposed in an area on which content is not displayed. In this instance, a lifetime of the pixel extends, and a possibility of occurrence of an afterimage is more minimized.

Hereinabove, when the display panel 151 moves in a horizontal direction has been described above as an example, but the display panel 151 may move in a vertical direction. For example, FIGS. 8*a* and 8*b* are diagrams illustrating an afterimage prevention method of a digital signage including a display panel moving in a horizontal direction, according to an embodiment of the present invention. In more detail, FIG. 8*a* is a perspective view of a digital signage 100 including a double-sided display panel moving in a horizontal direction, and FIG. 8*b* is a horizontal-direction cross-sectional view of the digital signage 100 including the double-sided display panel moving in the horizontal direction.

Referring to FIGS. 8*a* and 8*b*, the digital signage 100 including the double-sided display panel moving in the horizontal direction can include a first area 510*a* and a second area 510*b*. The first area 510*a* and the second area 510*b* can respectively be a front area and a rear area, or vice versa. Also, the first area 510*a* and the second area 510*b* can display the same content or different pieces of content.

The controller 190 can move the display panel 151 in an arrow direction as illustrated in FIG. 8*b* or move the display panel 151 in a direction opposite to the arrow direction illustrated in FIG. 8*b*. As described above, the controller 190 can move a content display area in a direction opposite to a moving direction of the display panel 151 while moving the display panel 151. Therefore, the controller 190 can continuously change content displayed by the display panel 151 without moving the content display area, thereby preventing the occurrence of an afterimage.

FIG. 9 is a diagram illustrating a moving method of a double-sided display panel moving in a vertical direction, according to an embodiment of the present invention. As illustrated in FIG. 9, the display panel 151 can be divided into a first panel part 811, a second panel part 812, a third panel part 813, a fourth panel part 814, a fifth panel part 815, a sixth panel part 816, a seventh panel part 817, an eighth panel part 818, a ninth panel part 819, a tenth panel part 820, an eleventh panel part 821, a twelfth panel part 822, a thirteenth panel part 823, and a fourteenth panel part 824. However, the division of the display panel 151 is merely an example for convenience of description, but is not limited thereto.

The controller 190 can perform control so that the eighth to thirteenth panel parts 818 to 823 display first content corresponding to a first area 510*a*, and the first to sixth panel parts 811 to 816 can display second content corresponding to a second area 510*b*. The controller 190 can turn off a pixel corresponding to a panel part disposed in an area on which content is not displayed. In the embodiment of FIG. 9, the controller 190 can turn off pixels included in the seventh panel part 817 and pixels included in the fourteenth panel part 824.

When a predetermined time t elapses, the controller 190 can move the first panel part 811 to a previous position of the second panel part 812, move the second panel part 812 to a previous position of the third panel part 813, move the third panel part 813 to a previous position of the fourth panel part 814, move the fourth panel part 814 to a previous position of the fifth panel part 815, move the fifth panel part 815 to a previous position of the sixth panel part 816, move the sixth panel part 816 to a previous position of the seventh panel part 817, move the seventh panel part 817 to a previous position of the eighth panel part 818, move the eighth panel part 818 to a previous position of the ninth panel part 819, move the ninth panel part 819 to a previous position of the tenth panel part 820, move the tenth panel part 820 to a previous position of the eleventh panel part 821, move the eleventh panel part 821 to a previous position of the twelfth panel part 822, move the twelfth panel part 822 to a previous position of the thirteenth panel part 823, and move the thirteenth panel part 823 to a previous position of the fourteenth panel part 824.

Therefore, the controller 190 can perform control so that the seventh to twelfth panel parts 817 to 822 display the first content and the first to fifth panel parts 811 to 815 display the second content, and turn off pixels corresponding to the sixth panel part 816 and pixels corresponding to the thirteenth panel part 823. As described above, the controller 190 can change a panel part displaying each of pieces of content and alternately turn off pixels included in each panel part, thereby preventing the occurrence of an afterimage.

The controller 190 can increase a moving speed of the display panel 151. In more detail, after a certain time elapses, the controller 190 can move the first panel part 811 to a previous position of the third panel part 813, or may move the first panel part 811 to a previous position of the fifth panel part 815. In this instance, moving the first panel part 811 to a previous position of the third panel part 813 is faster in moving speed of the display panel 151 than when moving the first panel part 811 to a previous position of the second panel part 812, and moving the first panel part 811 to a previous position of the fifth panel part 815 is faster in moving speed of the display panel 151 than when moving the first panel part 811 to a previous position of the third panel part 815. The controller 190 can control a moving speed and a moving position of the display panel 151, based on received afterimage-related data.

Hereinafter, a method of controlling the display panel 151 based on afterimage-related data according to an embodiment of the present invention will be described. For example, a method of moving the display panel based on a temperature of the display panel according to an embodiment of the present invention will be described with reference to FIGS. 10a to 10c. In more detail, FIG. 10a is a diagram illustrating a method of moving the display panel according to an embodiment of the present invention when a temperature of the display panel is low, FIG. 10b is a diagram illustrating a method of moving the display panel according to an embodiment of the present invention when a temperature of the display panel is high, and FIG. 10c is a diagram illustrating a method of moving the display panel according to an embodiment of the present invention when a temperature of a specific area of the display panel is high.

As illustrated in FIGS. 10a to 10c, the digital signage 100 may further include a temperature measurer 1000. The temperature measurer 1000 can measure a temperature of the display panel 151. In more detail, the controller 190 can divide the display panel 151 into a plurality of panel parts 1011 to 10024 and control the temperature measurer 1000 to measure a temperature of each of panel parts 1011 to 1024. The controller 190 can calculate an average temperature of measured temperatures of the respective panel parts.

According to a first embodiment of the present invention, the controller 190 can compare a reference temperature with the average temperature of the display panel 151 to control a movement of the display panel 151. In more detail, when the average temperature is lower than the reference temperature, the controller 190 can set a moving speed of the display panel 151 to a first speed.

Referring to FIG. 10a, the first speed may be a speed at which the first panel part 1011 moves to a previous position of the second panel part 1012 for a predetermined time t. The second to fourteenth panel parts 1012 to 1024 can move in a manner similar to the first panel part 1011.

When the average temperature is higher than the reference temperature, the controller 190 can set the moving speed of the display panel 151 to a second speed. The second speed may be faster than the first speed. Referring to FIG. 10b, the second speed may be a speed at which the first panel part 1011 moves to a previous position of the fourth panel part 1014 for the predetermined time t, but this is merely an example. The second to fourteenth panel parts 1012 to 1024 may move in a manner similar to the first panel part 1011.

That is, the controller 190 can calculate the average temperature of the display panel 151. When the average temperature is lower than the reference temperature, the controller 190 can move the display panel 151 at the first speed, and when the average temperature is higher than the reference temperature, the controller 190 can move the display panel 151 at the second speed which is faster than the first speed. As described above, the controller 190 can predict a possibility of occurrence of an afterimage, based on the temperature of the display panel 151 and move the display panel 151 in order for the afterimage not to occur.

According to a second embodiment of the present invention, the controller 190 can control a movement of the display panel 151 in proportion to the average temperature of the display panel 151. In more detail, the memory 170 can store a table where a plurality of average temperature values are mapped to respective moving speeds of the display panel 151 corresponding to the plurality of average temperature values. In this instance, a moving speed of the display panel 151 can become faster as the average temperature value increases.

The controller 190 can obtain a moving speed of the display panel 151 corresponding to the average temperature of the display panel 151 and can set a moving speed of the display panel 151. Therefore, the controller 190 can more precisely control a moving speed of the display panel 151, based on the average temperature of the display panel 151.

According to a third embodiment of the present invention, the controller 190 can control a movement of the display panel 151, based on a temperature of a specific part of the display panel 151. In more detail, the temperature measurer 1000 can measure temperatures of respective parts of the display panel 151.

The controller 190 can analyze a temperature measurement result to obtain a part, where a temperature is highest, of the display panel 151. In the embodiment of FIG. 10c, a temperature of the first panel part 1011 can be highest. The controller 190 can move the display panel 151 so that a part, where a temperature is highest, of the display panel 151 is located in an area on which content is not displayed. The controller 190 can also move the display panel 151 so that the first panel part 1011, where a temperature is highest, of the display panel 151 is located in an area on which content is not displayed, and can turn off pixels corresponding to the first panel part 1011.

The controller 190 can obtain a part, where a temperature is highest, of the display panel 151 at each predetermined period and locate the obtained part in an area on which content is not displayed. Therefore, the controller 190 can temporarily stop the use of a part where a possibility of occurrence of an afterimage is highest, thereby extending a lifetime of the display panel 151. Also, the controller 190 can periodically obtain a part where a possibility of occurrence of an afterimage is highest, and temporarily stop the use of the obtained part, thereby making lifetimes of the respective parts of the display panel 151 uniform.

Hereinafter, a moving method of a display panel based on a cumulative playback time of content according to an embodiment of the present invention will be described. In more detail, FIG. 11*a* is a diagram illustrating a moving method of a display panel when a cumulative playback time of content is short, according to an embodiment of the present invention, and FIG. 11*b* is a diagram illustrating a moving method of a display panel when a cumulative playback time of content is long, according to an embodiment of the present invention.

The controller 190 can calculate a cumulative playback time of content. Here, the cumulative playback time of the content can denote a total of time for which content which is being currently displayed is displayed. For example, the display panel 191 can display first content on a current first area 150*a*, display second content on a second area 150*b*, display third content on a previous first area 150*a*, and display fourth content on the second area 150*b*. In this instance, a cumulative playback time of content can denote a total of playback time of the first content and a total of playback time of the second content.

The controller 190 can compare a predetermined reference time with the calculated cumulative playback time of the content. When the cumulative playback time of the content is shorter than the predetermined reference time, the controller 190 can set a moving speed of the display panel 151 to a first speed. That is, when all of the calculated cumulative playback times of the content are shorter than the predetermined reference time, the controller 190 can set the moving speed of the display panel 151 to the first speed. Referring to FIG. 11*a*, the first speed may be a speed at which a first panel part 1111 moves to a previous position of a second panel part 1112 for a predetermined time t, but this is merely an example.

When one of the calculated cumulative playback times of the content are longer than the predetermined reference time, the controller 190 can set the moving speed of the display panel 151 to a second speed, and the second speed may be faster than the first speed. Referring to FIG. 11*b*, the second speed may be a speed at which the first panel part 1111 moves to a previous position of a fourth panel part 1114 for the predetermined time t, but this is merely an example. As described above, the controller 190 can calculate a cumulative playback time to prevent an afterimage which occurs when continuously playing back the same content.

Hereinafter, a moving method of a display panel based on the kind of displayed content according to an embodiment of the present invention will be described. In more detail, FIG. 12*a* is a diagram illustrating a moving method of a display panel when content is a dynamic image, according to an embodiment of the present invention, and FIG. 12*b* is a diagram illustrating a moving method of a display panel when content is a static image, according to an embodiment of the present invention.

The controller 190 can determine the kind of content displayed by the display panel 151. The content may be a static image such as a text, a picture, or the like, or may be a dynamic image such as a moving image or the like. According to a first embodiment of the present invention, the controller 190 can determine whether content is a static image or a dynamic image, based on the number of frames which are displayed for a predetermined time. That is, when the number of frames which are displayed for the predetermined time is smaller than a reference frame number, the controller 190 can determine the content as a static image, and when the number of frames which are displayed for the predetermined time is larger than a reference frame number, the controller 190 can determine the content as a dynamic image.

According to a second embodiment of the present invention, the controller 190 can determine whether content is a static image or a dynamic image, based on a tag included in the content. When the content is a dynamic image, the controller 190 can set a moving speed of the display panel 151 to a first speed. Referring to FIG. 12*a*, the first speed may be a speed at which a first panel part 1211 moves to a previous position of a second panel part 1212 for a predetermined time t, but this is merely an example.

When the content is a static image, the controller 190 can set the moving speed of the display panel 151 to a second speed, and the second speed may be faster than the first speed. Referring to FIG. 12*b*, the second speed may be a speed at which the first panel part 1211 moves to a previous position of a third panel part 1213 for the predetermined time t, but this is merely an example.

As described above, in consideration that when content is a static image is higher in possibility of occurrence of an afterimage than when content is a dynamic image, the controller 190 can determine the kind of the content to control a movement of the display panel 151.

Hereinafter, a moving method of a display panel based on the presence of sensing of a person according to an embodiment of the present invention will be described. In more detail, FIG. 13*a* is a diagram illustrating a method of controlling, by a controller, a display panel when a person is not sensed, according to an embodiment of the present invention, and FIG. 13*b* is a diagram illustrating a method of controlling, by a controller, a display panel when a person is not sensed, according to an embodiment of the present invention.

The data obtain unit 165 can sense whether a person is located in an area adjacent to the digital signage 100. For example, the data obtain unit 165 can include a camera and recognize a person by using the camera to sense whether the person is located or not. Alternatively, the data obtain unit 165 can include an infrared sensor and sense a body temperature of a person by using the infrared sensor to sense whether the person is located or not. However, this is merely an example. The data obtain unit 165 can sense whether a person is located or not, based on various methods. In the above-described method, the data obtain unit 165 can sense whether a person is located in a predetermined area from the digital signage 100.

The controller 190 can roll up or down the display panel 151, based on a person sensing result of the data obtain unit 165. In more detail, as illustrated in FIG. 13*a*, when a person is not located, the controller 190 can roll up the display panel 151, and as illustrated in FIG. 13b, when persons 1301 and 1302 are located, the controller 190 can roll down the display panel 151.

The display panel 151 may include only a first area 1310a in a roll-up state, and may include the first area 1310a and a second area 1310b in a roll-down state. When a person is sensed and thus the display panel 151 is rolled down, the controller 190 can change content which is being displayed in the first area 1310a. That is, the controller 190 can allow first content to be displayed on the first area 1310a in a roll-up state, and when a person is sensed and thus the display panel 151 is rolled down, the controller 190 can perform control so that second content is displayed on the first area 1310a and the first content or third content is displayed on the second area 1310b.

Therefore, an afterimage is prevented from occurring when the same content is continuously displayed on the same area, and when a person is not located, power unnecessarily consumed by the display panel 151 is reduced. Also, the controller 190 can automatically sense whether a person is located or not, and by rolling down the display panel 151, inconvenience where a user should touch the display panel 151 to input a user input is removed.

According to another embodiment of the present invention, the controller 190 can perform control so that a moving speed of the display panel 151 when a person is not sensed differs from a moving speed of the display panel 151 when a person is sensed, thereby minimizing the occurrence of an afterimage. In more detail, the controller 190 can continuously move the display panel 151 irrespective of whether a person is sensed, thereby minimizing the occurrence of an afterimage. Also, the controller 190 can perform control so that a moving speed of the display panel 151 when a person is sensed is slower than a moving speed of the display panel 151 when a person is not sensed. In this instance, obstruction of content viewing of a user caused by a movement of the display panel 151 is minimized, and an afterimage is prevented.

According to an embodiment of the present invention, the controller 190 can control a movement of the display panel 151, based on an ambient brightness of the display panel 151. In more detail, when the ambient brightness of the display panel 151 is equal to or more than a predetermined reference brightness, the controller 190 can lower a brightness of the display panel 151 and move the display panel 151 at a first speed, and when the ambient brightness of the display panel 151 is less than the predetermined reference brightness, the controller 190 can increase a brightness of the display panel 151 and move the display panel 151 at a second speed. Here, the second speed may be faster than the first speed.

Therefore, since a possibility of occurrence of an afterimage increases as a brightness of the display panel 151 increases, the controller 190 can control a brightness of the display panel 151 and move the display panel 151, based on ambient brightness. As described above, the controller 190 can receive various afterimage-related data to prevent an afterimage in a method appropriate for a current situation.

FIG. 2 will be described again. In operation S109, the controller 190 can obtain state data of each pixel. Here, the state data of each pixel may include a use duration of each pixel, the presence of breakdown of each pixel, and the remaining lifetime of each pixel. The controller 190 can obtain a use duration of each pixel and the presence of breakdown of each pixel for each pixels of display panel 151.

Next, FIG. 14 is a diagram illustrating pixel-based state data of a display panel according to an embodiment of the present invention. In more detail, FIG. 14 (a) illustrates state data of each pixel of a first area 150a, FIG. 14 (b) is a side cross-sectional view illustrating the first area 150a and a second area 150b of the display panel 151, and FIG. 14 (c) illustrates state data of each pixel of a second area 150b.

Each tetragonal box 1400 illustrated in FIG. 14 represents state data of each pixel. For example, as a color of the tetragonal box 1400 becomes deep, the use duration of a pixel may be long, and as the color of the tetragonal box 1400 becomes light, the use duration of the pixel may be short. X marked on the tetragonal box 1400 may represent that a corresponding pixel is in a breakdown state. However, state data of the display panel 151 illustrated in FIG. 14 is merely an example for convenience of description.

FIG. 2 will be described again. In operation S111, the controller 190 can obtain display panel control data, based on the state data of a pixel. The controller 190 can determine a moving direction and a moving speed of the display panel 151 for preventing an afterimage, based on the state data of the pixel. The controller 190 can also obtain the display panel control data including the moving direction and the moving speed of the display panel 151. In operation S113, the controller 190 can control a movement of the display panel 151, based on the obtained display panel control data.

Next, FIG. 15 is a diagram illustrating a moving method of a display panel based on state data of a pixel, according to a first embodiment of the present invention. As illustrated in FIG. 15, the controller 190 can divide the display panel 151 into a plurality of panel parts. In the embodiment of FIG. 15, the controller 190 can divide the display panel 151 into first to fourteenth panel parts 1411 to 1424, but this is merely an example for convenience of description. The present embodiment is not limited thereto.

The controller 190 can obtain a state of pixels for each of the panel parts. For example, the controller 190 can calculate a cumulative use duration of pixels included in each panel part to obtain a state of pixels. In this instance, the controller 190 can regard a use duration of a breakdown pixel as a maximum use duration, thereby calculating a cumulative use duration of pixels.

The controller 190 can obtain a panel part, having a worst state of pixels, of the plurality of panel parts. For example, the controller 190 can obtain the third panel part 1413 and the tenth panel part 1420, where a cumulative use duration of pixels is longest, as panel parts having a worst state of pixels.

As illustrated in FIG. 15, the controller 190 can move the third panel part 1413 and the tenth panel part 1420, where a cumulative use duration of pixels is longest, to a position at which content is not displayed. The controller 190 can turn off pixels corresponding to the third panel part 1413 and the tenth panel part 1420 where a cumulative use duration of pixels is longest, and perform control in order for the other panel parts to display content.

Therefore, a total use duration of the display panel 151 extends, and the occurrence of an afterimage is prevented. Alternatively, the controller 190 can control a moving speed of the display panel 151, based on state data of pixels of the display panel 151, thereby preventing an afterimage.

Next, FIG. 16a is a diagram illustrating a moving method of a display panel when state data of a pixel is bad, according to an embodiment of the present invention, and FIG. 16b is a diagram illustrating a moving method of a display panel when state data of a pixel is good, according to an embodiment of the present invention.

The controller 190 can calculate a cumulative use duration of each pixel to obtain a state of each pixel. For example, when the cumulative use duration of each pixel is shorter than a predetermined reference cumulative use duration, the controller 190 can determine a state of a pixel as good, and when the cumulative use duration of each pixel is longer than the predetermined reference cumulative use duration, the controller 190 can determine a state of a pixel as bad. However, such a method of determining a state of each pixel is merely an example.

As illustrated in FIG. 16a, when state data of a pixel is lower than reference state data, the controller 190 can set a moving speed of the display panel 151 to a first speed. The first speed may be a speed at which a first panel part 1611 moves a previous position of a fifth panel part 1615 for a predetermined time t, but this is merely an example.

As illustrated in FIG. 16b, when state data of a pixel is higher than the reference state data, the controller 190 can set the moving speed of the display panel 151 to a second speed, and the second speed may be slower than the first speed. The second speed may be a speed at which the first panel part 1611 moves a previous position of a second panel part 1612 for the predetermined time t, but this is merely an example.

As described above, the controller 190 can move the display panel 151, based on a state of each pixel configuring the display panel 151. Accordingly, in a state of minimizing a possibility of occurrence of an afterimage, content may be displayed based on a state of pixels.

FIG. 2 will be described again. In operation S115, the controller 190 can receive a content change command. The controller 190 can receive the content change command for changing content, which is being currently displayed by the display unit 150, to other content.

The content change command may include a command for changing one or more of pieces of content, which are being displayed by the display panel 151, to other content. When the content change command is not received, the controller 190 can obtain state data of each pixel of the display panel 151 to control a movement of the display panel 151. The controller 190 can obtain state data of each pixel at every predetermined period to control a movement of the display panel 151. When the content change command is received, the controller 190 can recommend a content output format, based on the state data of each pixel in operation S117.

According to an embodiment of the present invention, the controller 190 can recommend the content output format according to the content change command being received. According to another embodiment of the present invention, the controller 190 can receive a content format recommendation command and may recommend the content output format according to the content format recommendation command.

The content output format may be a format which is provided for minimizing the occurrence of an afterimage or maximizing a use duration of the display panel 151, and may be a format which divides the display panel 151 into a plurality of areas according to a state of pixels and recommends the kind of content for each of the divided plurality of areas.

Hereinafter, a method of recommending, by the controller 190, a content output format according to state data of pixels will be described with reference to FIGS. 17 to 20. First, FIG. 17 is an exemplary diagram illustrating an example where a display panel is divided based on state data of a pixel, according to an embodiment of the present invention. The controller 190 can obtain state data of pixels.

As illustrated in FIG. 17, the controller 190 can divide the display panel 151 into a plurality of areas, based on the obtained state data of the pixels. In more detail, the controller 190 can determine pixels, having similar state data among pixels disposed adjacent to one another, as the same area. When state data of pixels among pixels disposed adjacent to one another differ by a predetermined similarity or more, the controller 190 can determine the pixels as different areas. Thus, the controller 190 can divide the display panel 151 into the plurality of areas.

For example, FIG. 17 (a) is an example where pixels corresponding to a first area 150a of the display panel 151 are divided into a plurality of areas, FIG. 17 (b) is a diagram illustrating the first area 150a and a second area 150b of the display panel 151, and FIG. 17 (c) is an example where pixels corresponding to the second area 150b of the display panel 151 are divided into a plurality of areas. Referring to the embodiment of FIG. 17, the first area 150a may be divided into first to seventh areas 1701 to 1707, and the second area 150b may be divided into eighth to seventeenth areas 1708 to 1717. However, this is merely an example, and the present embodiment is not limited thereto. According to a first embodiment of the present invention, the controller 190 can display a plurality of areas divided based on state data of pixels to recommend a content output format.

FIG. 18 is a diagram illustrating a method of recommending a content output format according to a first embodiment of the present invention. As illustrated in FIG. 18, the controller 190 can display state data of each of pixels and a plurality of areas divided based on the state data of each of the pixels. In more detail, the display unit 150 can display a first area output format 1810, including state data of pixels included in a first area 150a and a plurality of areas, and a second area output format 1820 including state data of pixels included in a second area 150b and a plurality of areas.

In this instance, a user can select content which is to be displayed on each area, with reference to state data of pixels and divided areas. The controller 190 can select one area from among the output formats 1810 and 1820 as illustrated in FIG. 18 and change the selected area. In more detail, the controller 190 can select one area from among the output formats 1810 and 1820 as illustrated in FIG. 18 and change a size, a shape, or a position of the selected area. Therefore, a user can be recommended a content output format, and simultaneously, change the recommended content output format.

FIG. 19 is a diagram illustrating a method of recommending a content output format according to a second embodiment of the present invention. The controller 190 can divide the display panel 151 into a plurality of areas, based on state data of pixels and recommend output content for each of the plurality of areas. The output content may be a text or an image, but this is merely an example. The output content may be subdivided into a text, a static image, a dynamic image, and/or the like.

As illustrated in FIG. 19, the display unit 150 can display a first area output format 1910, representing recommendation content for each of a plurality of areas included in a first area 150a, and a second area output format 1920 representing recommendation content for each of a plurality of areas included in a second area 150b. Therefore, a user can easily select and output content according to a provided content output format, thereby minimizing a possibility of occurrence of an afterimage and enabling the display panel 151 to be operable for a long time.

FIG. 20 is a diagram illustrating a method of recommending a content output format according to a third embodiment of the present invention. Similarly to the details described above with reference to FIG. 19, the controller 190 can recommend a plurality of areas and output content for each of the plurality of areas. According to the embodiment of FIG. 20, the controller 190 can recommend a pixel off area. According to a second embodiment of the present invention, the controller 190 can divide the display panel 151 into a plurality of areas and may recommend content which is to be displayed on each area or may recommend pixel off.

The display unit 150 can display a first area output format 2010, representing a pixel off area and a recommendation content area included in a first area 150*a*, and a second area output format 2020 representing a pixel off area and a recommendation content area included in a second area 150*b*. The recommendation content area may include a text display area and an image display area.

The controller 190 can perform control to reduce a size of content, which is displayed when the pixel off area is provided, and display the size-reduced content on the recommendation content area. Therefore, the present invention solves a problem where an afterimage frequently occurs in a side area due to a characteristic of advertisement content mainly displayed on the digital signage 100.

As described above, according to an embodiment of the present invention, the occurrence of an afterimage is minimized by moving the display panel 151, and a content recommendation method for minimizing the occurrence of an afterimage is recommended. According to another embodiment of the present invention, the controller 190 can change a position of content and allow the position-changed content to be displayed, based on state data of pixels. In more detail, the controller 190 can receive a content output command. In this instance, the controller 190 can allow content to be displayed on a predetermined area according to a content output command.

Alternatively, the controller 190 can change a display area of content and allow the content to be displayed on the changed display area, based on state data of pixels. That is, the controller 190 can perform automatic control so that content is displayed on an area which enables the display panel to be operable for a long time, even without a separate manipulation of a user. Accordingly, inconvenience where a user should change a position of content in order for a display panel to be operable for a long time is removed.

In order to describe the digital signage and an operating method thereof according to the embodiments of the present invention, an example where the display unit is a rollable display, a double-sided display moving in a horizontal direction, or a double-sided display moving in a vertical direction has been described above, but this is merely an example for convenience of description. The embodiments of the present invention are not limited thereto.

According to an embodiment, the above-described method can also be embodied as computer readable codes on a computer readable recording medium. Examples of the computer readable recording medium include read-only memory (ROM), random-access memory (RAM), CD-ROMs, magnetic tapes, floppy disks, and optical data storage devices.

As can be seen from the foregoing, the digital signage in accordance with the embodiments are not limited to the configuration and method of the embodiments described above, but all or some components of the embodiments may be configured to be selectively combined such that various modifications of the embodiments can be implemented.

The invention claimed is:

1. A display device comprising:
a display panel configured to display content;
a controller configured to:
display first content in a first area of the display panel,
obtain display panel control data, based on received afterimage-related data, and
move the display panel based on the display panel control data, and
display the first content in a second area of the display panel.

2. The display device of claim 1, wherein the second area is in a direction opposite to a moving direction of the display panel.

3. The display device of claim 1, wherein the display panel control data comprises one or more of a moving direction, a moving speed, and a moving period of the display panel.

4. The display device of claim 1, wherein the afterimage-related data comprises at least one of a type of the display panel, a temperature of the display panel, a cumulative playback time of the first content displayed on the display panel, a type of the first content, an ambient brightness of the display panel, or whether a person is sensed or not.

5. The display device of claim 4, wherein the controller is further configured to:
when the type of the display panel is a rollable display, control the display panel to be in a first state including the first area or a second state including the first area and the second area, and
wherein first content displayed on the first area in the first state differs from second content displayed on the first area in the second state.

6. The display device of claim 4, wherein the controller is further configured to:
when the temperature of the display panel is higher than a predetermined reference temperature, move the display panel at a first speed, and
when the temperature of the display panel is lower than the predetermined reference temperature, move the display panel at a second speed, and
wherein the first speed is faster than the second speed.

7. The display device of claim 4, wherein the controller is further configured to:
when the cumulative playback time of the first content is longer than a predetermined reference time, move the display panel at a first speed, and
when the cumulative playback time of the first content is shorter than the predetermined reference time, move the display panel at a second speed, and
wherein the first speed is faster than the second speed.

8. The display device of claim 4, wherein the controller is further configured to:
when the type of the content is a static image, move the display panel at a first speed, and
when the type of the content is a dynamic image, move the display panel at a second speed, and
wherein the first speed is faster than the second speed.

9. The display device of claim 4, wherein the controller is further configured to:
when the ambient brightness of the display panel is lower than a reference brightness, move the display panel at a first speed, and
when the ambient brightness of the display panel is higher than the reference brightness, move the display panel at a second speed, and
wherein the first speed is faster than the second speed.

10. The display device of claim 4, wherein the controller is further configured to:
when a person is not sensed in a predetermined area from the digital signage, set the display panel to the first state, and
when a person is sensed in the predetermined area from the digital signage, set the display panel to the second state, and
wherein the first content displayed on the first area in the first state differs from second content displayed on the first area in the second state.

11. The display device of claim 4, wherein the controller is further configured to:
when a person is not sensed in a predetermined area from the digital signage, move the display panel at a first speed, and
when a person is sensed in the predetermined area from the digital signage, move the display panel at a second speed, and
wherein the first speed is slower than the second speed.

12. The display device of claim 1, wherein the controller is further configured to:
obtain pixel state data for each pixel of the display panel, and
move the display panel, based on the pixel state data.

13. The display device of claim 12, wherein the controller is further configured to:
change an output area of the first content, based on the state data of the pixel.

14. The display device of claim 12, wherein the pixel state data comprises a use duration of a corresponding pixel.

15. The display device of claim 14, wherein the controller is further configured to:
move the display panel so that an area corresponding to a pixel where the use duration of the pixel is longest is disposed in an area on which the first content is not displayed.

16. The display device of claim 12, wherein the controller is further configured to:
display the pixel state data on the display panel.

17. The display device of claim 12, wherein the controller is further configured to:
recommend a content output format, based on the pixel state data.

18. The display device of claim 17, wherein the content output format comprises a plurality of areas divided based on the pixel state data and recommendation content for each of the plurality of areas.

19. The display device of claim 18, wherein the corrimendati on content comprises a text, a static image, and a dynamic image.

20. The display device of claim 17, wherein the controller is further configured to:
in response to a content change command for changing the displayed content to other content, display the content output format.

* * * * *